(12) United States Patent
Bjørnerud et al.

(10) Patent No.: US 8,428,327 B2
(45) Date of Patent: Apr. 23, 2013

(54) VESSEL SEGMENTATION IN DCE MR IMAGING

(75) Inventors: Atle Bjørnerud, Oslo (NO); Kyrre Eeg Emblem, Oslo (NO)

(73) Assignee: Oslo Universitetssykehus HF, Oslo (NO)

( * ) Notice: Subject to any disclaimer, the term of this patent is extended or adjusted under 35 U.S.C. 154(b) by 224 days.

(21) Appl. No.: 12/990,912

(22) PCT Filed: May 7, 2009

(86) PCT No.: PCT/EP2009/055570
§ 371 (c)(1),
(2), (4) Date: Mar. 7, 2011

(87) PCT Pub. No.: WO2009/135923
PCT Pub. Date: Nov. 12, 2009

(65) Prior Publication Data
US 2011/0170759 A1 Jul. 14, 2011

(30) Foreign Application Priority Data

May 8, 2008 (EP) .................................... 08103872

(51) Int. Cl.
*G06K 9/00* (2006.01)
(52) U.S. Cl.
USPC .............................. 382/131; 382/274; 378/21
(58) Field of Classification Search .................. 382/100, 382/103, 107, 128–134, 162, 168, 173, 181, 382/194, 199, 224, 232, 254, 274, 276, 305, 382/312; 600/411; 250/370.09; 424/239.1; 378/21
See application file for complete search history.

(56) References Cited

U.S. PATENT DOCUMENTS

| | | | | |
|---|---|---|---|---|
| 7,705,316 | B2 * | 4/2010 | Rousso et al. | 250/370.09 |
| 8,009,885 | B2 * | 8/2011 | Grass et al. | 382/128 |
| 8,090,164 | B2 * | 1/2012 | Bullitt et al. | 382/128 |
| 8,208,987 | B2 * | 6/2012 | Hengerer et al. | 600/411 |
| 2009/0232849 | A1 * | 9/2009 | Gallez et al. | 424/239.1 |

OTHER PUBLICATIONS

Emblem, Kyrre E. et al., "Glioma Grading by Using Histogram Analysis of Blood Volume Heterogeneity from MR-derived Cerebral Blood Volume Maps" Radilogy, Jun. 2008, pp. 808-817, vol. 247, No. 3.
Hadjiprocopis, Andreas et al., "Unbiased segmentation of diffusion-weighted magnetic resonance images of the brain using iterative clustering" Magnetic Resonance Imaging, 2005, pp. 877-885, vol. 23.

(Continued)

*Primary Examiner* — Seyed Azarian
(74) *Attorney, Agent, or Firm* — Knobbe Martens Olson & Bear LLP

(57) ABSTRACT

The invention relates to segmenting blood vessels in perfusion MR images, more particularly, the invention relates to automated vessel removal in identified tumor regions prior to tumor grading. Pixels from a perfusion related map from dynamic contrast enhancement (DCE) MR images are clustered into arterial pixels and venous pixels by e.g. a k-means class cluster analysis. The analysis applies parameters representing the degree to which the tissue entirely consists of blood (such as relative blood volume (rBV), peak enhancement ($\Delta R_2^{max}$) and/or post first-pass enhancement level ($\Delta R_{2p}$)) and parameters representing contrast arrival time at the tissue (such as first moment of the area (fmAUC) and/or contrast arrival time ($T_0$)). The artery and venous pixels are used to form a vessel mask. The invention also relates to a computer aided diagnostic (CAD) system for tumor grading, comprising automated tumor segmentation, vessel segmentation, and tumor grading.

10 Claims, 17 Drawing Sheets

OTHER PUBLICATIONS

Kubassova, Olga "Automatic Segmentation of Blood Vessels from Dynamic MRI Datasets" School of Computing, University of Leeds, UK, pp. 593-600.

Mouridsen, Kim et al., "Automatic Selection of Arterial Input Function Using Cluster Analysis" Magnetic Resonance in Medicine, 2006, pp. 524-531, vol. 55.

Rausch, M. et al., "Analysis of input functions from different arterial branches with gamma variate functions and cluster analysis for quantitative blood volume" Magnetic Resonance Imaging, 2000, pp. 1235-1243, vol. 18.

Wu, Yu-Te et al., "Classification of Spatiotemporal Hemodynamics From Brain Perfusion MR Images Using Expectation-Maximization Estimation With Finite Mixture of Multivariate Gaussian Distributions" Magnetic Resonance in Medicine, 2007, pp. 181-191, vol. 57.

Boxerman, J.L. et al., "Relative Cerebral Blood Volume Maps Corrected for Contrast Agent Extravasation Significantly Correlate with Glioma Tumor Grade, Whereas Uncorrected Maps Do Not" Am J Neuroradiol, Apr. 2006, pp. 859-867, vol. 27.

* cited by examiner

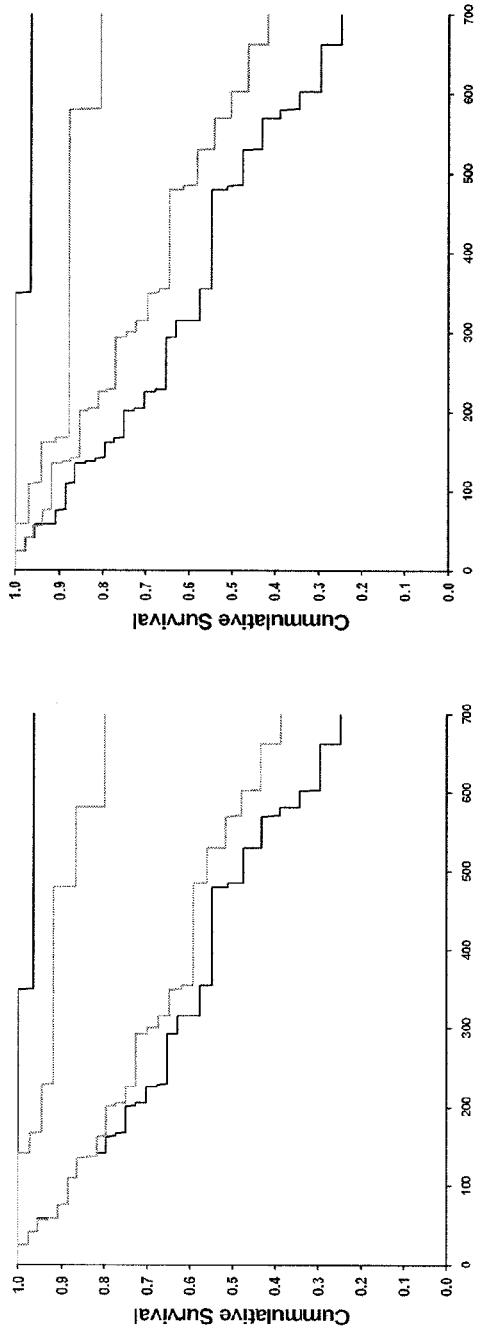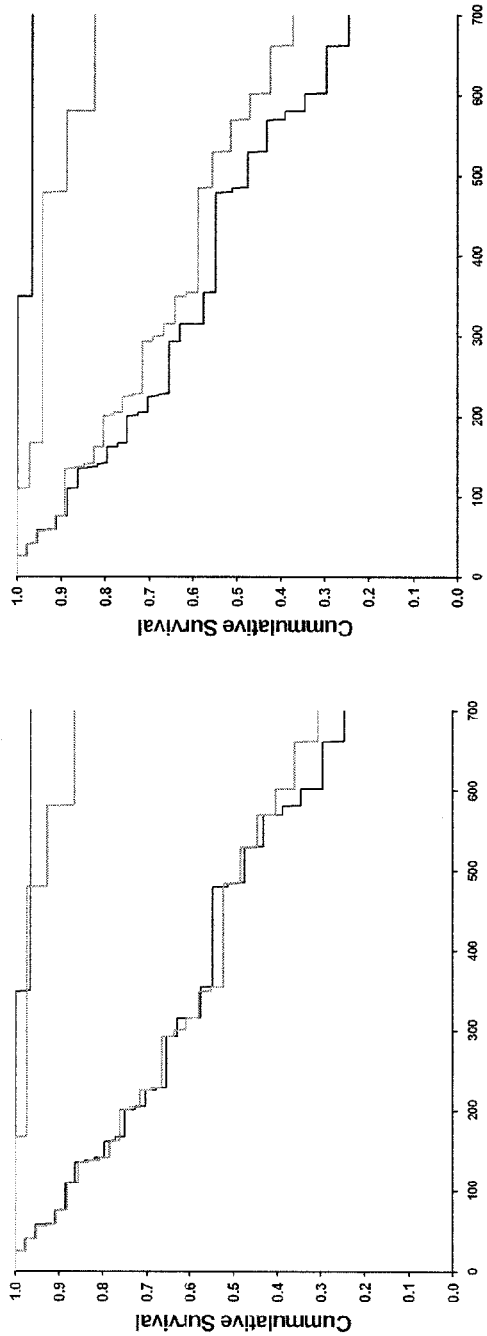

VESSEL SEGMENTATION IN DCE MR IMAGING

CROSS REFERENCE TO RELATED APPLICATIONS

This application claims the benefit and priority to and is a U.S. National Phase Application of PCT International Application Number PCT/EP2009/055570, filed on May 7, 2009, designating the United States of America and published in the English language, which is an International Application of and claims the benefit of priority to European Patent Application No. 08103872.1. The disclosures of the above-referenced applications are hereby expressly incorporated by reference in their entireties.

FIELD OF THE INVENTION

The present invention relates to segmenting blood vessels in MR images, more particularly, the invention relates to automated vessel removal in identified tumor regions prior to tumor grading.

BACKGROUND OF THE INVENTION

Perfusion imaging based on dynamic contrast enhanced (DCE) MRI is a widely used technique for grading tumors, especially for brain tumors (gliomas) due to their inherent inaccessibility. Several studies have shown a good correlation between histopathological glioma grade and blood volume (BV) derived from perfusion imaging.

Traditionally, an experienced neuroradiologist identifies the tumor region in relevant slices, and the tumor can be graded. however, there is a movement towards computer aided diagnostics (CAD) within tumor grading, and automated methods for segmenting (identifying) tumors from MR images exists, as well as automated methods for grading the identified tumors in BV maps (hot-spot or histogram methods).

Blood volume maps (or similar perfusion related maps) used in automated tumor identification and grading are meant to determine the volume of blood in a region of tissue. The blood volume is used to evaluate the micro-vascular density or vascularity, in other words, the density of small blood vessels (capillaries) in a tissue region. BV map is preferably obtained by perfusion imaging whereby images are acquired before, during and after injection of a contrast agent. Due to relatively small voxel sizes (typically tens of mm$^2$) of the perfusion imaging technique, large vessels in the region could result in a misleading shift of the BV frequency distribution towards higher BV values.

Therefore, inclusion of BV values from vessels having dimensions of the order of or larger than the typical spatial resolution of the applied imaging technique is a confounding factor in the grading, as these are not separable from values from malicious tissue in the automated tumor segmentation. BV values from vessels are therefore sought to be excluded from the regions whose BV values are used in the data analysis. Thus, reliable data may only be obtained by, prior to the automated grading, having a neuroradiologist manually exclude larger vessels from the BV maps based on anatomical knowledge and experience.

SUMMARY OF THE INVENTION

A more efficient and/or reliable method for identifying vessels in perfusion imaging would be advantageous, and in particular a method for automated vessel segmentation in perfusion related maps would be advantageous. It is therefore an object of the invention to provide a method and a system for automated vessel segmentation in perfusion related maps that solves the above mentioned problems of the prior art.

It is another object of the invention to improve the diagnostic accuracy of automated tumor grading by providing a method and a system for automatically segmenting and removing blood vessels in the perfusion related maps used in the tumor grading.

Thus, the above described object and several other objects are intended to be obtained in a first aspect of the invention by providing a computer program product being adapted to enable a computer system comprising at least one computer having data storage means in connection therewith to generate a vessel mask from perfusion related maps from dynamic contract enhanced (DCE) MR images as specified in claim 1.

This aspect of the invention is particularly, but not exclusively, advantageous in that the present invention may be accomplished by such a computer program product down- or uploaded into the computer system. Such a computer program product may be provided on any kind of computer readable medium, or through a network.

In another aspect, the invention provides a method for segmenting blood vessels in perfusion related maps from DCE MR images in accordance with embodiments encompassed by the present claims.

In yet another aspect, the invention provides a computer system for computer aided tumor grading in accordance with embodiments encompassed by the present claims. In a preferred embodiment, the system further comprises a computer program product for generating and providing a tumor grading report based on the assessed tumor grade.

In still another aspect, the invention provides a method for automatic tissue segmentation in accordance with embodiments encompassed by the present claims. The tumor segmentation determining an assessed tumor region may be carried out manually by a neuroradiologist (typically by marking up an area in the image), who would then not have to take special care to not include vessel areas (as these are removed by use of the vessel mask). In a preferred embodiment, it is performed automatically as will be described in detail later. Also, in another preferred embodiment, the method further comprises performing an automated tumor grading based on values of pixels in perfusion map corresponding to the pixels in the selected regions of interest.

The individual aspects of the present invention may each be combined with any of the embodiments, implementations or preferences described in the following, also when such is described in relation to a specific aspect for the cause of brevity.

In embodiments of these aspects, perfusion imaging or DCE imaging refers to techniques such as $T_1$-, $T_2$-, or $T_2$*-weighted imaging, such as preferably dynamic susceptibility contrast (DSC) imaging. Also, in embodiments of these aspects, perfusion related maps are preferably maps of absolute or relative blood volume (rBV), relative blood flow (rBF), post first-pass enhancement level ($\Delta R_{2p}$), or mean transit time (MTT).

k-class cluster analysis splits n objects (here pixels) based on features (here for example rBV, $\Delta R_{2p}$, $\Delta R_2^{max}$, $T_0$, fmAUC) into k clusters, k<n, by maximizing variation between clusters relative to variation within each cluster. In other words, the analysis attempts to find the centers of natural clusters in the value space of the features, and group the objects according to these centers.

There exist several different cluster analysis methods. In a preferred embodiment, the cluster analysis is k-means cluster analysis. k-means cluster analysis is a convenient method because you end up with binary classes (=1, whereas all other pixels=0). Another preferred cluster analysis is the fussy c-means (FCM) cluster analysis which results in cluster classes with values ranging from 0-1, instead of just a value of 1. Here, the value in each pixel represents how strong the pixel is associated to a specific class. I.e., if a pixel in a vessel cluster class has the value 0.99, is almost certainly a vessel pixel, whereas a neighbor pixel with the value 0.2 might not be a vessel pixel because of different DCE parameter properties. Using this method, one can introduce a threshold scaling, which can be used manually of automatically.

The cluster analysis preferably generates k clusters where $k \geq 2$ for clustering with respect to the features rBV and/or $\Delta R_{2p}$ and/or $\Delta R_2^{max}$ where only a cluster with largest mean values are required, and where $k \geq 3$ for clustering with respect to the features $T_0$ and fmAUC where clusters for both smallest and largest mean values are required. In a preferred embodiment, k=5, and in another preferred embodiment k is any odd integer $\geq 3$. Also, the cluster(s) with largest/smallest feature mean values may be a group of adjacent (with respect to the feature mean value) clusters, such as sub-clusters. For example, in case of 7-class cluster analysis, with resulting clustered numbered 1-7 according to mean value of the feature, clusters 1+2 may be identified as the clusters with smallest mean value of the feature, and clusters 6+7 may be identified as the clusters with largest mean value of the feature. The value of k, in any given application, may preferably be set by the user.

The mean value of a feature refers to the mean of the values of that feature for all pixels in a cluster.

A vessel mask is the pixels in the perfusion related map that remains after removal of the artery and venous pixels. Thus, the final vessel mask does not have pixels representative of vessels. Also, in addition to the arterial and venous pixel classes, the map is preferably also clustered into one or more non-vessel pixel classes, consisting of pixels not belonging to the clusters of the arterial and venous pixel classes. Hence, in the above example, pixels in clusters 3-5 may be identified as non-vessel pixels.

The curve parameters representing the degree to which the tissue entirely consists of blood are preferably selected as one or more of relative blood volume (rBV), and/or peak enhancement ($\Delta R_2^{max}$) and/or post first-pass enhancement level ($\Delta R_{2p}$). Also, the curve parameters representing contrast arrival time at the tissue are preferably selected as one or more of first moment of the area (fmAUC) and/or contrast arrival time ($T_0$). For the sake of clarity, we refer to pixels throughout the description, as MRI images are represented at two-dimensional slices, however, many of the parameters used relates to a volume as they are extracted from a corresponding voxel.

The features, or curve parameters, rBV, rBF, $\Delta R_{2p}$, and $\Delta R_2^{max}$ represent different measures of the degree the pixel/voxel entirely consist of blood. Here, rBV represents a measure of blood volume per voxel volume, which is largest (here typically equal to 1) if the voxel is entirely within a vessel. rBF represents tissue perfusion (flow) (vol/time) which is largest if entire volume is perfused, which is the case if voxel is entirely within vessel. $\Delta R_{2p}$ which represents the 'steady state' $\Delta R_2$ level following the first-passage of the contrast agent and is largest if the entire voxel contains blood. Similarly, the features, or curve parameters, $T_0$ and fmAUC represent different measures of contrast arrival time at the tissue in a pixel, i.e. is tissue early (artery) or late (vein) in blood circulation. As the preferred specified features/parameters represent different measures of similar physiological situations, they may be used as substituent features (the 'or's) which may provide the advantage of improving simplicity and computation speed and reducing the required MRI acquisitions. In the alternative, the specified pair-wise features may be used as complimenting features (the 'and's) which may provide the advantage of improving the diagnostic accuracy (sensitivity, specificity, NPV, PPV) of the tumor grading.

The pixels comprised in the formed vessel mask are removed from the original perfusion related maps to create vessel segmented maps. Also, prior to vessel identification, the DCE images are co-registered to anatomical MR images using normalized mutual information algorithms or similar.

In a preferred embodiment, said cluster analysis are performed in two clustering steps; a first clustering step applying the curve parameters for rBV and $\Delta R_{2p}$, wherein pixels in cluster(s) with largest mean rBV and/or mean $\Delta R_{2p}$ value(s) are selected as potential vessel pixels; and a second clustering step using only potential vessel pixels that have been selected in the first step, the second clustering step applying the curve parameters for $T_0$ and fmAUC and determining arterial and venous pixels based on mean $T_0$ and/or mean fmAUC value(s).

In further preferred embodiments, the invention comprises initial filtering or sorting of pixels in the perfusion related map, so that only some pixels are used in the clustering into arterial and venous pixel classes. Here, removed pixels are not used in the subsequent vessel segmentation. In one embodiment, an initial multi-class cluster analysis is performed, applying curve parameters for relative mean transit time (rMTT) obtainable from the dynamic contrast-enhanced curves for in the DCE MR images, wherein pixels in cluster(s) with largest mean rMTT value(s) are not used in the subsequent cluster analysis into arterial and venous pixel classes. In another embodiment, an initial multi-class cluster analysis is performed, applying curve parameters for intensity (SI) obtainable from the dynamic contrast-enhanced curves for in the DCE MR images, wherein pixels in cluster(s) with largest mean SI value(s) are not used in the subsequent cluster analysis into arterial and venous pixel classes. In this last embodiment, baseline DCE images refers to the DCE images acquired prior to the contrast arrival defined by $T_0$.

In the majority of the following description, implementations and applications of embodiments according to the invention are described in relation to segmenting vessels derived cerebral blood volume (CBV) maps from dynamic susceptibility contrast (DSC, $T_2$*-weighted) MRI for glioma (brain tumors consisting of neuroglia). However, this is not to be construed as being limiting to other possible embodiments falling within the scope of the attached claim set, such as implementations and applications for other perfusion related maps (such as for blood perfusion or mean transit time), maps obtained by other perfusion imaging techniques, or related to other types of tumors elsewhere in a patient.

The invention provides the advantage of removing false positives without introducing false negatives in a subsequent automated tumor grading.

The invention is particularly, but not exclusively, advantageous for allowing a vessel segmentation wherein vessels from elevated rBV values at a capillary level in the tumor can be differentiated. In a preferred embodiment, this is implemented by using a pre-mask to exclude areas of elevated MTT or intensity values.

Using an automated analysis method of whole tumor rBV heterogeneity to determine the tumor region, a fully automated tumor and vessel segmentation technique may provide similar diagnostic accuracy to manual tumor definition by an expert.

In an embodiment the invention uses an automatic procedure for normalization of CBV maps in DSC-based glioma imaging. In order to characterize gliomas from dynamic susceptibility contrast (DSC) based cerebral blood volume (CBV) maps, a CBV value from a normal-appearing, region-of-interest is typically identified manually and used to normalize the CBV maps. This method is user dependent and time consuming. An embodiment of the invention provides an alternative approach based on automatic identification of normal-appearing first-pass curves from brain tissue. Results in 101 patients suggest similar or better diagnostic accuracy values than the manual approach.

The following references report agreement between manual arterial input function (AIF) selection and an automatic routine procedure for AIF selection based on k-means cluster analysis. These report identifying pixels (typically 5-10 pixels in the whole image) most likely to represent the arterial input function (AIF). The AIF is needed in order to quantify perfusion and MTT (i.e. obtain perfusion values which are independent of injection procedure). The described methods cannot be applied to detect arteries and veins in the images.

Mouridsen K, Christensen S, Gyldensted L, Ostergaard L. Automatic selection of arterial input function using cluster analysis. Magn Reson Med 2006 March; 55(3):524-31.

Rausch M, Scheffler K, Rudin M, Radu E W. Analysis of input functions from different arterial branches with gamma variate functions and cluster analysis for quantitative blood volume measurements. Magn Reson Imaging 2000 December; 18(10):1235-43.

It is a basic idea of the invention to apply a cluster analysis algorithm to automatically identify and remove image pixels representative of large vessels (arteries and veins), based on the shape and characteristics of the AIF for each pixel. Here, the AIF may be identified and separated from tissue by using parameters such as contrast arrival time ($T_0$), Blood volume values (BV), peak enhancement values ($\Delta R_2^{max}$) post first-pass enhancement level ($\Delta R_{2p}$), first moment of the area (fmAUC), relative mean transit time (rMTT). Vessel segmentation based on such dynamic first-pass parameters can improve the diagnostic efficacy of DCE imaging for tumor grading. The proposed method is attractive in that it provides a mask which covers all pixels affected by the intravascular susceptibility effect.

These and other aspects of the invention will be apparent from the following description with reference to the described embodiments.

DESCRIPTION OF THE FIGURES

The present invention will now be explained, by way of example only, with reference to the accompanying Figures, where

FIG. 14 illustrates, based on optimal cut-off values between high-grade (WHO grades III-IV) and low-grade gliomas (WHO grades I-II), Kaplan-Meier survival curves derived for the histogram method (gray lines) and compared to the reference WHO classification (black lines). The figures show survival curves for histology versus; (A) Original nCBV maps, (B) vessel masks, (C) MTT corrected vessel masks and (D) SI corrected vessel masks.

DETAILED DESCRIPTION OF THE INVENTION

Figure 1:
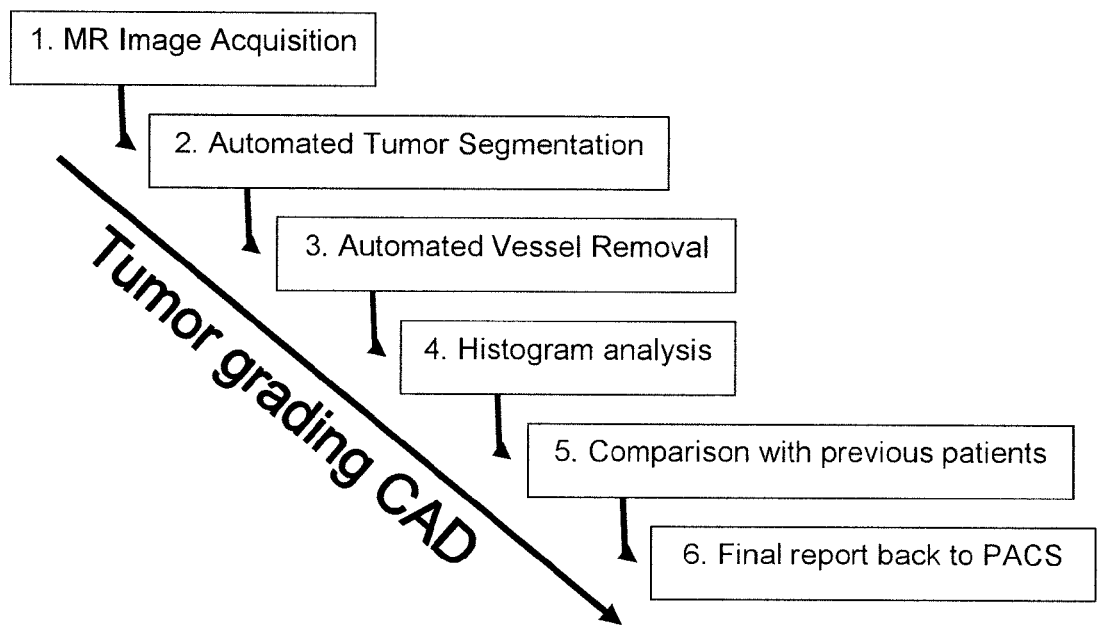
FIG. 1 illustrates the process of a tumor grading CAD.

FIG. 1 illustrates the overall structure of a system or a method for computer aided diagnosis of tumors, comprising steps 1-6 as indicated.

Figure 2A:
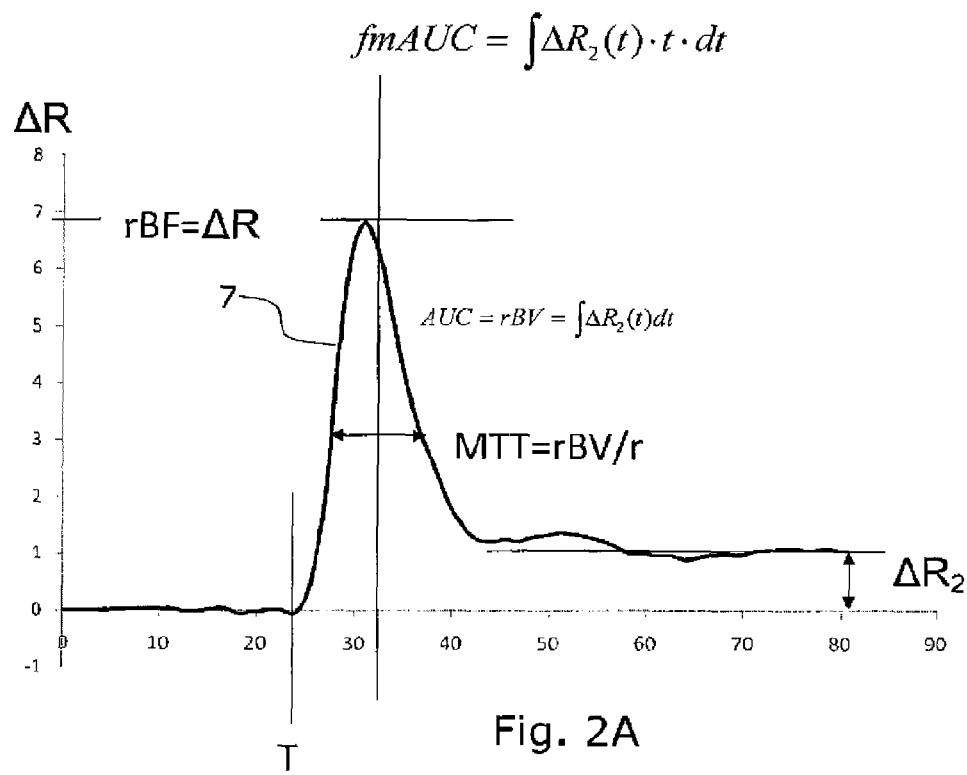
FIG. 2 illustrates definitions of different parameters or features used in the cluster analysis on a curve of the arterial input function.
Figure 2B:
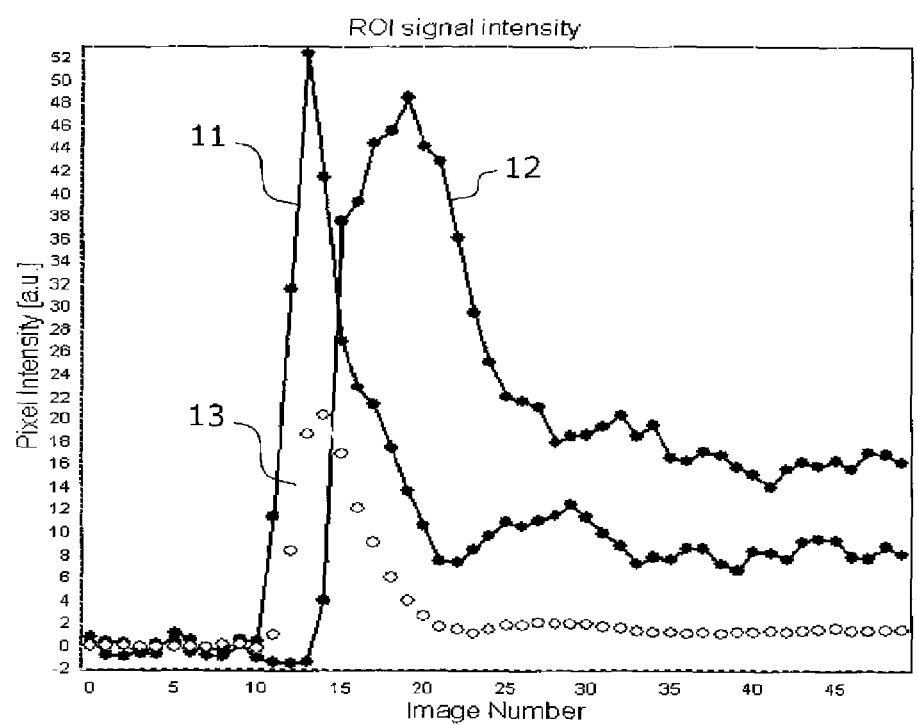

Some common abbreviations used in the present description are:
MR: magnetic resonance
AIF: arterial input function
$\Delta R_2$: change in transverse relaxation rate ($1/T_2$ or $1/T_2^*$) due to the presence of an MR contrast agent in the tissue of interest
DCE: dynamic contract enhanced
DSC: dynamic susceptibility contrast
rCBV: relative (cerebral) blood volume
nCBV: normalized (cerebral) blood volume
rMTT: relative mean transit time
$T_0$: contrast arrival time
$\Delta R_2^{max}$: maximum first-pass change in $T_2$ relaxation rate, related to tissue perfusion (rBF)
fmAUC: first moment of the area under curve
$\Delta R_{2p}$: post first-pass enhancement level FIG. 2A illustrates definitions of different parameters or features used in the cluster analysis on a curve 7 showing an arterial input function. Such curve is a dynamic first-pass curve of the contrast agent passing through a given pixel or region. Whether or not the curve is representative of an AIF is a relative term. In FIG. 2B, curve 11 is a first-pass curve from a pixel within an artery, which has distinct features compared to the first-pass curve from a pixel within a vein (curve 12) and the capillaries (curve 13).

Figure 3:
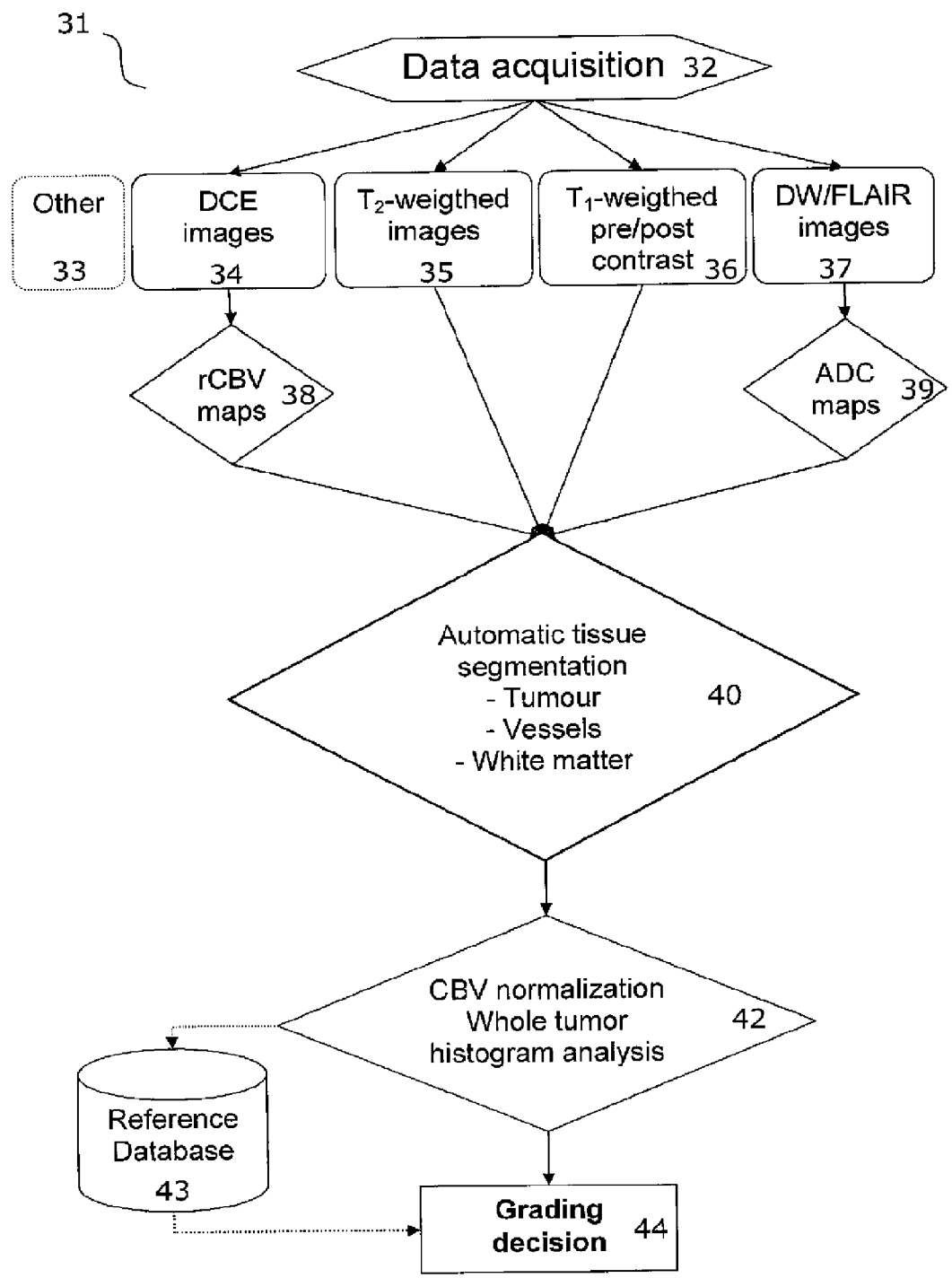
FIG. 3 is an illustration of a layout of a system for computer aided tumor grading, or for performing automated vessel segmentation in accordance with various embodiments of the invention.

FIG. 3 is a flow diagram 31 used in the following to embody various embodiments of the invention. The flow diagram 31 outlines and embodies the system architecture, such as software architecture, and processes comprised in the system for computer aided tumor grading according to an embodiment of the invention. Also, parts of the flow diagram 31 outlines and exemplifies the process steps comprised in the method and computer program product for segmenting blood vessels in a perfusion related map from dynamic contrast enhancement (DCE) MR images according to an embodiment of the invention. Although described in relation to the example of CBV maps of brain tumors obtained by perfusion MRI, the corresponding process or architecture can be applied to techniques applied by other embodiments of the invention.

First, the data used to form perfusion maps representing blood volume and to perform segmentation of tumor tissue and vessels is acquired in box 32, typically a medical scanning technique such as MRI, CT or PET. The acquired data is used to form DCE images (box 34) used to generate the rCBV maps (box 38) and images (box 35 and 36) to be coregistered with the maps to enable selection of regions to be applied in the grading. Other images may be formed if needed (box 33 and box 37).

Obtaining BV data for a tumor by perfusion imaging is a well established technique within the art and has been extensively described. In short, perfusion imaging can be performed by MRI or multi-detector CT scanning by following an intravenously injected bolus of contrast agent. During the first pass of the contrast agent through the vascular system (typically of the order 5 to 15 seconds), it remains in the intravascular space. In MRI perfusion imaging, the intravascular paramagnetic contrast molecules cause a shortening of $T_2$ and $T_2^*$ relaxation, which results in signal loss. Relevant image types include dynamic susceptibility contrast (DSC) images, $T_2$-weighted images, $T_1$-weighted images, FLAIR images and diffusion weighted (DW) images (boxes 34-37). DCE images are used to generate regional cerebral blood volume (rCBV) maps based on the analysis of the dynamic signal response following bolus injection of the contrast agent (box 38). Apparent diffusion coefficient (ADC) maps (box 39) are generated by analysis of the signal change as a function of diffusion weighting obtained from the DW images. In CT perfusion imaging, the high concentration of the intravascular contrast agent during the first pass causes a higher density. From the changes in signal loss (MRI) or the increase in density (CT), the concentration of the contrast agent in each pixel can be calculated, and a pixel by pixel relative estimate of blood volume can be inferred. Maps of blood volume (BV) and blood flow (BF) or mean transit time (MTT) can be generated.

Having the required images and maps, the selection of tissue regions (pixels) whose corresponding values in the map are to be applied in the grading can be performed (box 40). In FIG. 1, this corresponds to the steps of automated tumor segmentation (2) and automated vessel removal (3), and will be described in detail later. Areas of necrosis can also be sorted out in the tissue segmentation.

Having selected the regions to be applied in the grading, a computers aided grading can be performed. A preferred embodiment of procedure is the subject of, and described in detail in, U.S. patent application Ser. No. 11/715,529 and CA patent application No. 2,581,904, hereby incorporated by reference. The CBV values from the pixels in the CBV maps corresponding to the selected regions are used to form a frequency distribution, or histogram, by defining a plurality of value intervals or bins, and counting the number of values of the selected regions within each bin (box 42). When forming the histogram, an appropriate number of intervals or bins should be selected. Having too many would result in too "flat distribution" with very few or none values in each bin. Having too few would result in a very peaked distribution regardless of the heterogeneity of the values. Often, one the following rules may be used to determine the number of bins, N, from the number of data points, n, here the number of BV values (voxels) in the tumor regions selected to be applied in the analysis:

$$N=A\sqrt{n}$$

$$N=10 \log n$$

Here A is a constant that may be determined for one sample to give a suitable frequency distribution for the purpose of determining the grading, where after the equation can be used to scale the number of bins for different data sets.

Further in box 42, the individual values are normalized against values from normal tissue in the same subject, or against a standard reference value. Reference tissue can be obtained by several means. First, it can be obtained by manual selection by a trained user. Alternatively it can be obtained by automated methods whereby the unaffected white matter of the brain is automatically segmented out using established segmentation techniques. Finally, standardization can be achieved by relating the rCBV to the arterial input function; e.g. the first-pass response in an artery feeding the relevant parts of the brain tissue. The arterial input function can be selected manually or automatically using appropriate segmentation techniques. This will be descried later in relation to a more detailed example. Also the frequency distribution itself can be normalized so that the area under the resulting histogram curve equals 1.

Figure 4:
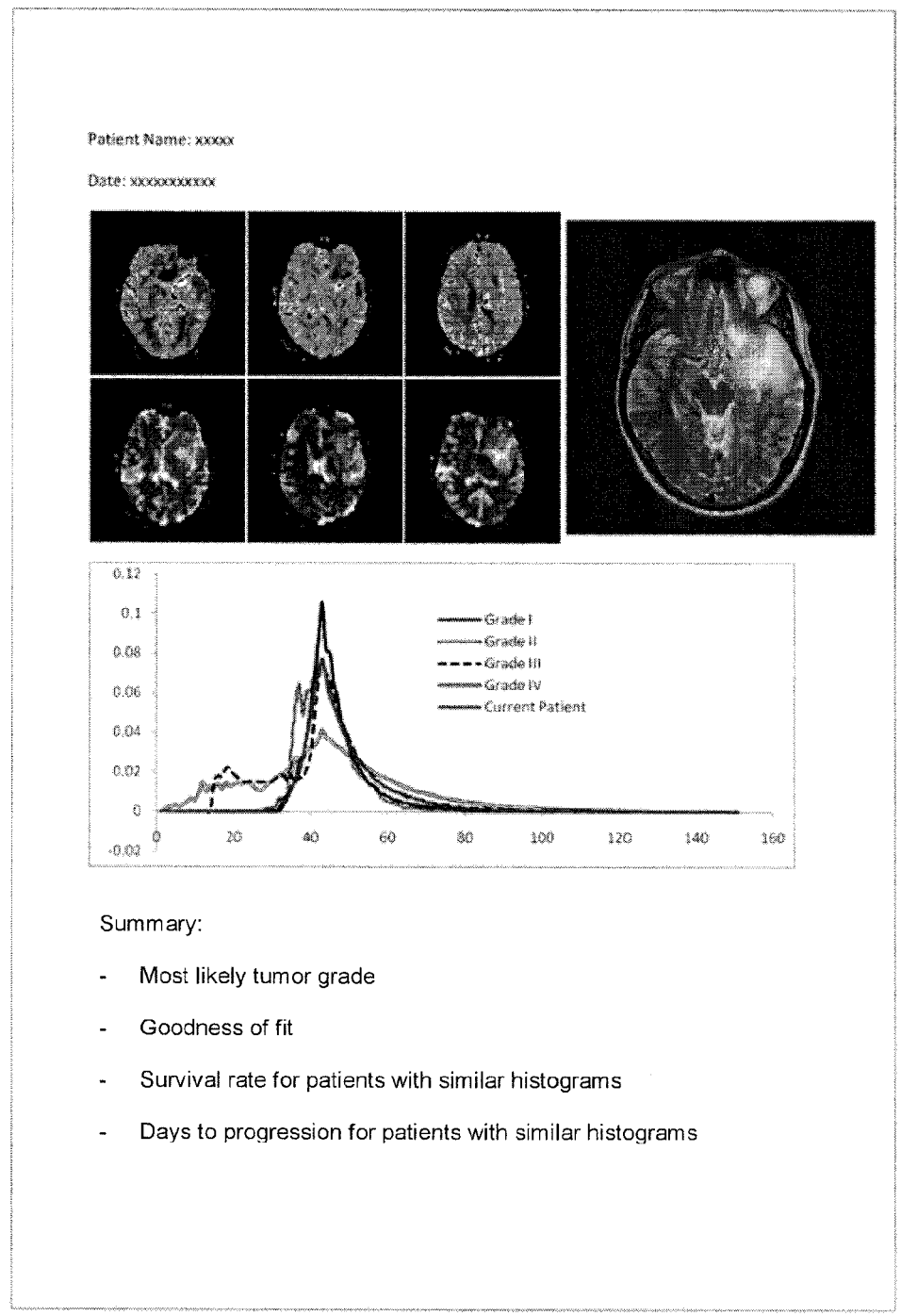
FIG. 4 shows an exemplary report generated by the system according to an embodiment of the invention.

The resulting histogram can be evaluated in different ways to estimate a grade of the tumor. An experienced radiologist that has evaluated a large number of such histograms can estimate a tumor grade directly from the normalized histogram. This is indicated by the arrow between boxes 42 and 44. Hence, in one embodiment, the system may simply present the histogram to the operator. In other embodiments, the systems may indicate a grading to the operator. In a preferred embodiment, the system presents a comprehensive report to the operator, comprising the relevant images, histogram curves, reference data and possibly an estimated tumor grade. The operator (neuroradiologist) can thereby also confirm the validity of the automated grading. An example of such report is shown in FIG. 4.

Figure 5:
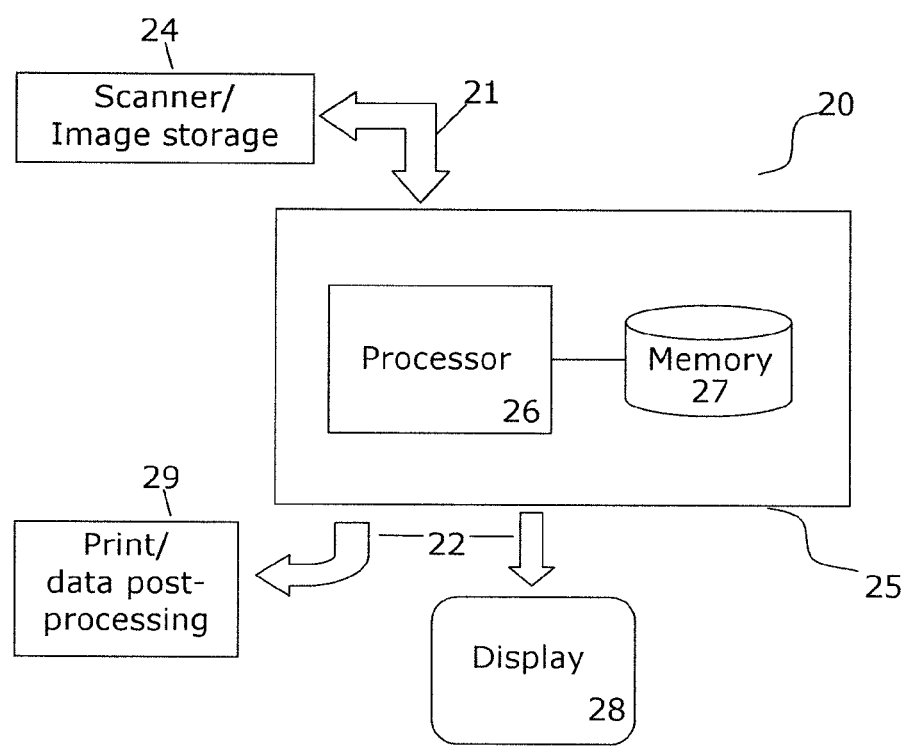
FIG. 5 is a flow diagram illustrating the method and software architecture according to embodiments of the invention.

FIG. 5 illustrates a hardware layout of a system 20 for automated vessel segmentation, automated tissue segmentation or for computer aided tumor grading in accordance with various embodiments of the invention. The system 20 has means 21 for receiving or accessing image data to be processed from an image recording apparatus such as a CT, MR, or PET scanner 24. Alternatively, 24 may represent an internal or external storage holding images recorded by such apparatus. The means 21 may e.g. be a data bus allowing access to a memory, an internet connection, or a cable or wireless connection. The system comprises a computer 25 or a similar processing apparatus holding an electronic processor 26 and memory 27 for holding and executing computer programs for vessel segmentation, tissue segmentation, histogram analysis and/or tumor grading using the received image data, such as BV maps containing BV values and other contrast images for identifying and selecting relevant tumor regions. A possible architecture for such software is described in relation to FIG. 3 in the previous paragraphs. After processing the received image data, the resulting vessel mask, segmented tumor region, or histogram/tumor grade could be applied in further (post)processing or displayed, printed etc. The system therefore also has means 22 for transmitting the result to a display 28, a printer, or to a further processing 29, e.g. a cable, data bus, internet connection or similar.

In relation to FIGS. 3 and 5, it is noted that the invention can be implemented by means of hardware, software, firmware or any combination of these. The invention or some of the features thereof can also be implemented as software running on several, potentially distributed, data processors and/or digital signal processors. The individual elements of an embodiment of the invention may be physically, functionally and logically implemented in any suitable way such as in a single unit, in a plurality of units or as part of separate functional units.

In the following, various embodiments of the vessel segmentation are described for MR-derived cerebral blood volume (CBV) maps from gliomas in a recent study. In addition, tumor segmentation and glioma grading were performed, and these data serves to embody another embodiment of the invention, as well as to be used in showing the usefulness, validity and effect of the automated vessel segmentation.

The data, examples and figures disclosed herein were obtained using:
  MR Imaging: 1.5 Tesla (Siemens Sonata, Symphony or Avanto, Siemens AG, Erlangen, Germany); DSC MR Imaging (GRE-EPI); Axial $T_1$-w SE and $T_2$-w FSE
  rCBV analysis: rCBV maps generated using established tracer kinetic models applied to the first-pass data obtained by bolus injection of 0.2 mmol/kg of Gadovist (Bayer Schering Pharma AG, Berlin, Germany) and corrected for possible extra-vascular contrast agent leakage effects
  Image analysis: Matlab R2007a (Math Works, Natick, US) and nordicICE (NordicImagingLab, Bergen, Norway).
Patient Selection Between July 2005 and November 2007, eighty-six patients received a histological diagnosis of primary glioma after MR perfusion imaging and subsequent surgery, and agreed to allow use of their data in our study. Of these, eighty-one patients (aged 9-78 yrs, mean age 49; 46 males, 35 females) had performed a MR image protocol suitable for automated tumor identification. The histological evaluation was performed by a neuropathologist using the World Health Organization (WHO) classification of central nervous system (CNS) tumors. WHO glioma grades I-II are referred to as LGGs, and WHO glioma grades III-IV are referred to as high-grade gliomas (HGGs).
Vessel Segmentation The images were post-processed using a dedicated software package (nordicICE, NordicImagingLab, Bergen, Norway) and Matlab R2007a (Math Works, Natick, US). Relative (r)CBV maps were generated from the area under the $1/T_2$* converted first-pass curves and corrected for possible extravascular contrast agent leakage effects. Based on the first-pass curves, the first moment of the area (fmAUC), contrast arrival time ($T_0$) and relative mean transit time (rMTT) were estimated for each pixel. rMTT maps were estimated as the ratio $rCBV/R_{2max}$ where $R_{2max}$ is the peak height of the first-pass curve. In the current vessel segmentation procedure, nCBV maps were created from the original rCBV maps by voxel-vise division of the rCBV values with an unaffected slice-specific white matter rCBV value defined by a neuroradiologist. As an alternative, the rCBV maps can be normalized automatically as described in this document. The images were displayed using a black-blue-green-yellow-red-white color map. All nCBV maps were automatically coregistered with the conventional MR images using a normalized mutual information algorithm.

The vessel segmentation was performed as follows; an iterative 5-class k-means cluster analysis was performed to identify arteries and veins from estimated parameters, rCBV, fmAUC and $T_0$. Details for applicable cluster analysis for segmentation can be found in e.g. Hadjiprocopis et. al. *Unbiased segmentation of diffusion-weighted magnetic resonance images of the brain using iterative clustering*. Magn Reson Imaging 2005 October; 23(8):877-85, and references therein. Arterial pixels were identified as the pixel class with the shortest $T_0$ combined with the highest rCBV values. Venous pixels were identified as the pixel class with the largest fmAUC combined with the highest rCBV values. The resulting binary masks consisted of arterial and venous pixels only and vessel segmented nCBV maps (hereby referred to as vessel masks) were created by removing pixels in the original nCBV maps corresponding to the binary masks. Thus, the vessel mask is the pixels in the nCBV map that remains after removal of the binary vessel pixels. Thus, the final vessel mask does not have pixels representative of vessels.

As an optional feature, an additional vessel segmentation algorithms can be performed which may improve the effect of the vessel mask on the subsequent glioma grading. In a first embodiment, the optional feature consist of, prior to identification of arterial and venous pixels, an initial iterative 5-class k-means cluster analysis was performed to identify and remove the pixel class with the highest mean rMTT values thought to represent tumor tissue. This was based on the hypothesis that highly vascular tumor tissue would exhibit increased rMTT values relative to unaffected tissue or blood due to a more complex vascular structure. Then, on the four remaining pixel classes, the original iterative 5-class k-means cluster algorithm was applied to identify arteries and veins as previously described. This final segmented nCBV vessel maps are hereby referred to as MTT corrected vessel masks.

In a first embodiment of the optional feature, the initial cluster step using the rMTT cluster algorithm was replaced by a similar 5-class k-means cluster routine removing the cluster class with the highest mean signal intensities as seen on the $T_2$-w baseline DSC images prior to the bolus arrival. This was based on the hypothesis that, high intensities on $T_2$-w images are secondary to pathology whereas large blood vessels appear dark.

Automated Tumor Segmentation

For each patient, the tumor volume was automatically segmented using a previously published knowledge-based Fuzzy C-Means (FCM) cluster technique shown to correspond well with radiologist-labeled tumor volumes. First, based on a 3-class k-means clustering algorithm, a skull strip was performed by removing the cluster class representing the highest mean value as seen on the pre-contrast $T_1$-w images. Second, including every slice with presence of tumor tissue as defined by a neuroradiologist, the FCM algorithm was applied to the $T_2$-w and FLAIR images. For the $T_2$-w images, a 3-class FCM algorithm was performed to separate pixels representing air, brain tissue and fluid/tumor tissue. The fluid/tumor class was defined as the cluster class with the highest mean value as seen on the $T_2$-w image. For the FLAIR images, a 4-class FCM algorithm was performed to separate pixels representing air, brain tissue, fluids and tumor tissue. The tumor class was defined as the cluster class with the highest mean value as seen on the FLAIR images. For both the $T_2$-w and the FLAIR images, a set of knowledge-based morphological operations was performed to remove spur non-tumor pixels mimicking tumor tissue. The final tumor image was a combination of the $T_2$-w and FLAIR tumor classes from the FCM analysis. Also, using a 3-class k-means cluster algorithm, areas of contrast enhancement as seen on post-contrast $T_1$-w images was always included. Here, based on post-contrast $T_1$-w values, presence of contrast enhanced was assumed if; (a) the mean value minus the standard deviation of a cluster class was higher than the mean value plus standard deviations of the other classes, (b) the variance of a cluster class was 4 times higher than the variance of the other classes.

As this segmentation procedure is somewhat complex, a potentially simpler seed-growing algorithm based on intensity values as seen on FLAIR images or $T_2$-w images (in combination of separate) can also be used, and is considered within the scope of the invention.

Glioma Grading

The grading was performed using a previously reported histogram method, please refer to U.S. patent application Ser. No. 11/715,529 and CA patent application No. 2,581,904, or Emblem et. al. *Glioma Grading using Histogram Analysis of Blood Volume Heterogeneity from MR-derived Cerebral Blood Volume Maps*. Radiology 2007 (In press). Histograms signatures were generated for each patient using nCBV values from the complete tumor volumes. The range of the nCBV values along the x-axis was kept constant (values; 0-20) and the area under each histogram curve was normalized to one. Glioma malignancy was assessed by measuring the maximum normalized peak height of the distributions. The histograms were divided into 108 bins, a number shown to give the maximal diagnostic accuracy.

Statistical Analysis

Mean histogram peak heights with standard errors for LGG and HGG were assessed based on the original nCBV maps and the three vessel segmented nCBV maps. Logistic regression was used to derive sensitivity values, specificity values, negative predictive values (NPV) and positive predictive values (PPV) between LGGs and HGGs. A glioma classified as HGG or LGG by both observer data and histology was considered as a true-positive/true-negative finding, respectively. Pair-wise comparisons of the areas ($A_c$) under the Receiver Operating Characteristic (ROC) using the histogram peak heights from the original nCBV maps and the three vessel segmented nCBV maps were assessed. Also, based on available survival data, Kaplan-Meier survival curves were derived from the original nCBV maps and the three vessel segmented nCBV maps. Here, the optimal cut-off values between HGG and LGG from the logistic regression analysis were used to derive a survival curves for patients with histogram peak heights over- and under the cut-off value and compared to survival curves based on histopathology. Statistical analysis was performed using SPSS 13 (Apache Software Foundation, Chicago, US).

Of the 81 patients investigated, 45 received a histological diagnosis of a HGG (WHO grade III-IV), and 36 patients received a diagnosis of a LGG (WHO grade I-II). Of the LGGs, there were 4 grade I pilocytic astrocytomas, 1 gemistocytic astrocytoma, 18 grade II diffuse astrocytomas, 5 grade II oligodendrogliomas and 8 grade II oligoastrocytomas. Of the HGGs, there were 4 grade III anaplastic astrocytomas, 3 grade III anaplastic oligodendrogliomas, 4 grade III anaplastic oligoastrocytomas and 34 grade IV glioblastomas.

Vessel Segmentation

FIGS. 6E and F show binary masks from the vessel segmentation from two different slices shown in FIGS. 6A and B, respectively, from a patient with a low-grade diffuse (WHO grade II) astrocytoma. Note the identification of the main arteries and veins in (E) and (F), also partially recognized on the structural MR images (A-D). FIGS. 7C and D shows the used rCBV maps and FIGS. 7E and F shows the resulting vessel masks.

Figure 6:
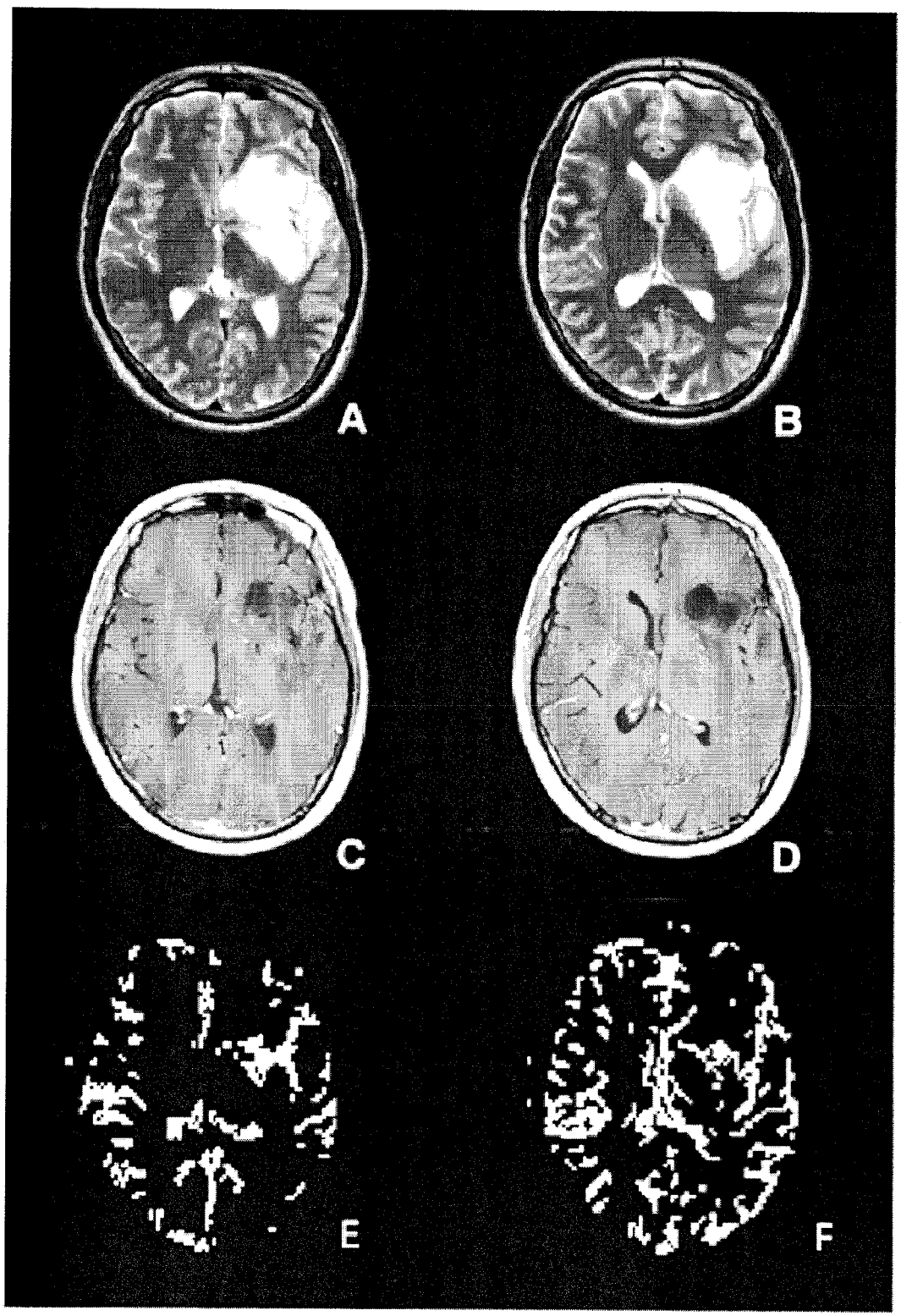
FIG. 6 shows: (A, B) Axial $T_2$-weighted fast spin-echo images (TR=4000/TE=104) of a patient with a low-grade (WHO grade II) diffuse astrocytoma. (C, D) Axial post-contrast $T_1$-weighted spin-echo images (TR=500/TE=7.7) of the same patient. (E, F) Coregistered binary masks from same slices as in (A) and (B), respectively.
Figure 7:
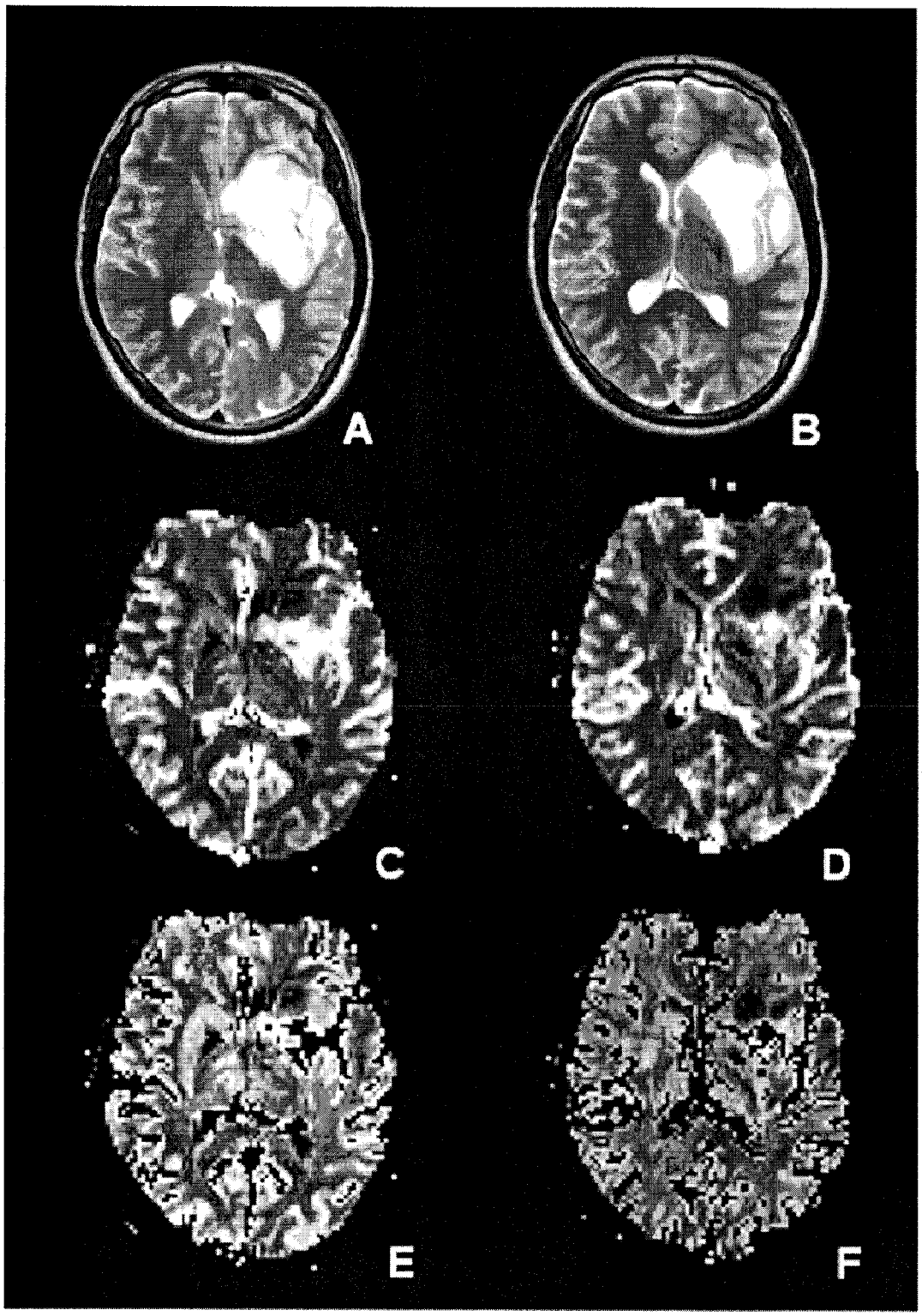
FIG. 7 shows: (A, B) Axial $T_2$-weighted fast spin-echo images of same patient as in FIG. 6. (C, D) Original rCBV maps and (C, D) vessels masked rCBV maps. Both rCBV maps have been coregistered to the $T_2$-weighted scan.
Figure 8:
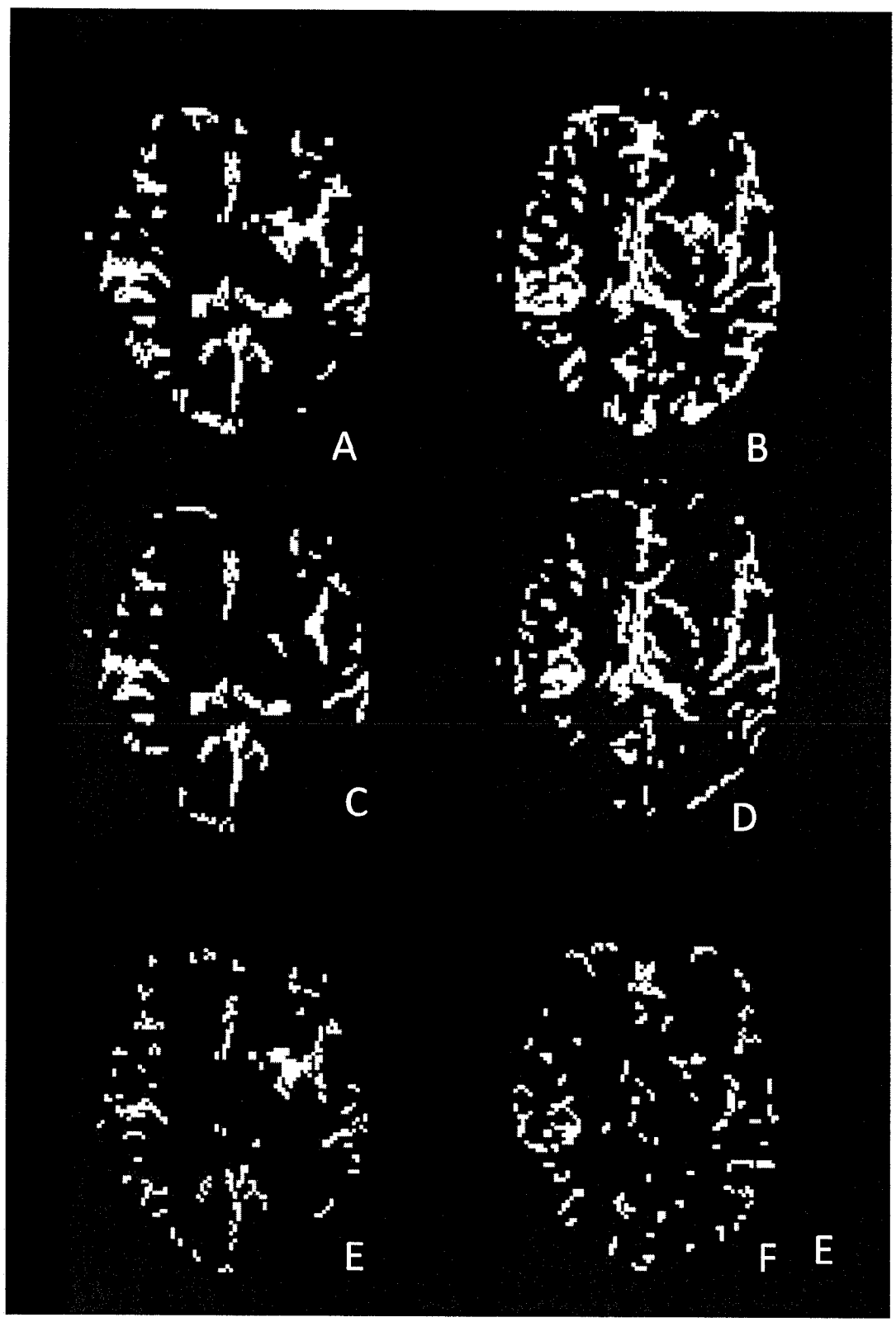
FIG. 8 shows: (A, B) Comparison of uncorrected binary vessel masks (A, B), with SI corrected masks (C, D) and MTT corrected masks (E, F). Compared to the uncorrected binary vessel masks the binary MTT and SI corrected masks are generally more conservative in masking out pixels representing vessels. All masks are from the same patient as in FIG. 6 and have been coregistered to the $T_2$-weighted images.
Figure 9:
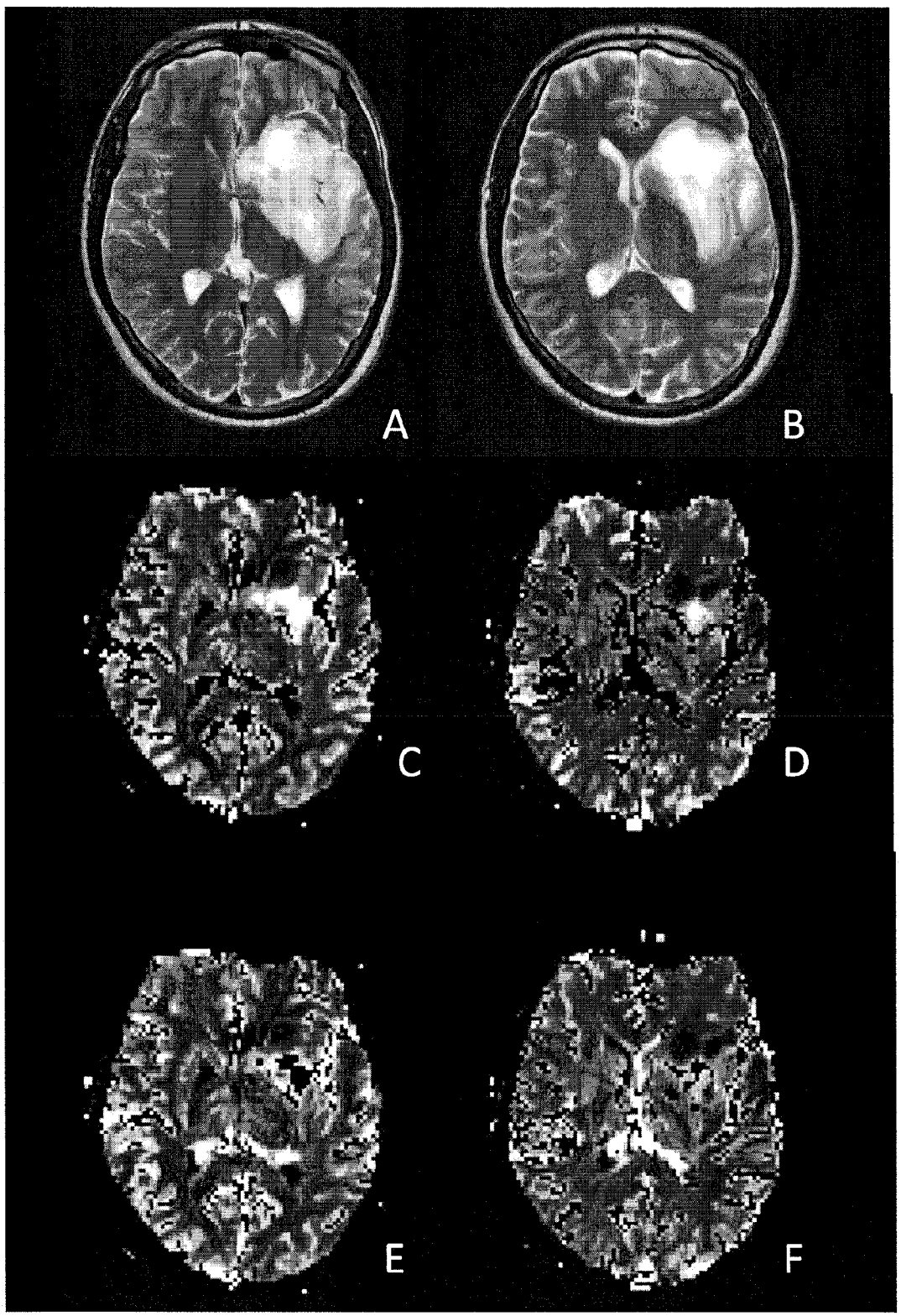
FIG. 9 shows: (C, D) Vessel masked rCBV maps with MTT correction and (E, F) vessel masked rCBV maps with SI correction, all coregistered to the $T_2$-weighted images in (A, B). Images are from same patient as in FIG. 6.

FIGS. 8A-F show uncorrected binary masks (A and B) and similar corrected binary masks when using SI correction (C and D) and MTT correction (E and F) of the same patient as in FIG. 6. Compared to the uncorrected binary vessel masks the binary MTT and SI corrected masks are generally more conservative in masking out pixels representing vessels. FIGS. 9C and D show the resulting vessel masked rCBV maps with MTT correction and FIGS. 9E and F show vessel masked rCBV maps with SI correction, all coregistered to the $T_2$-weighted images in (A, B).

Figure 10:
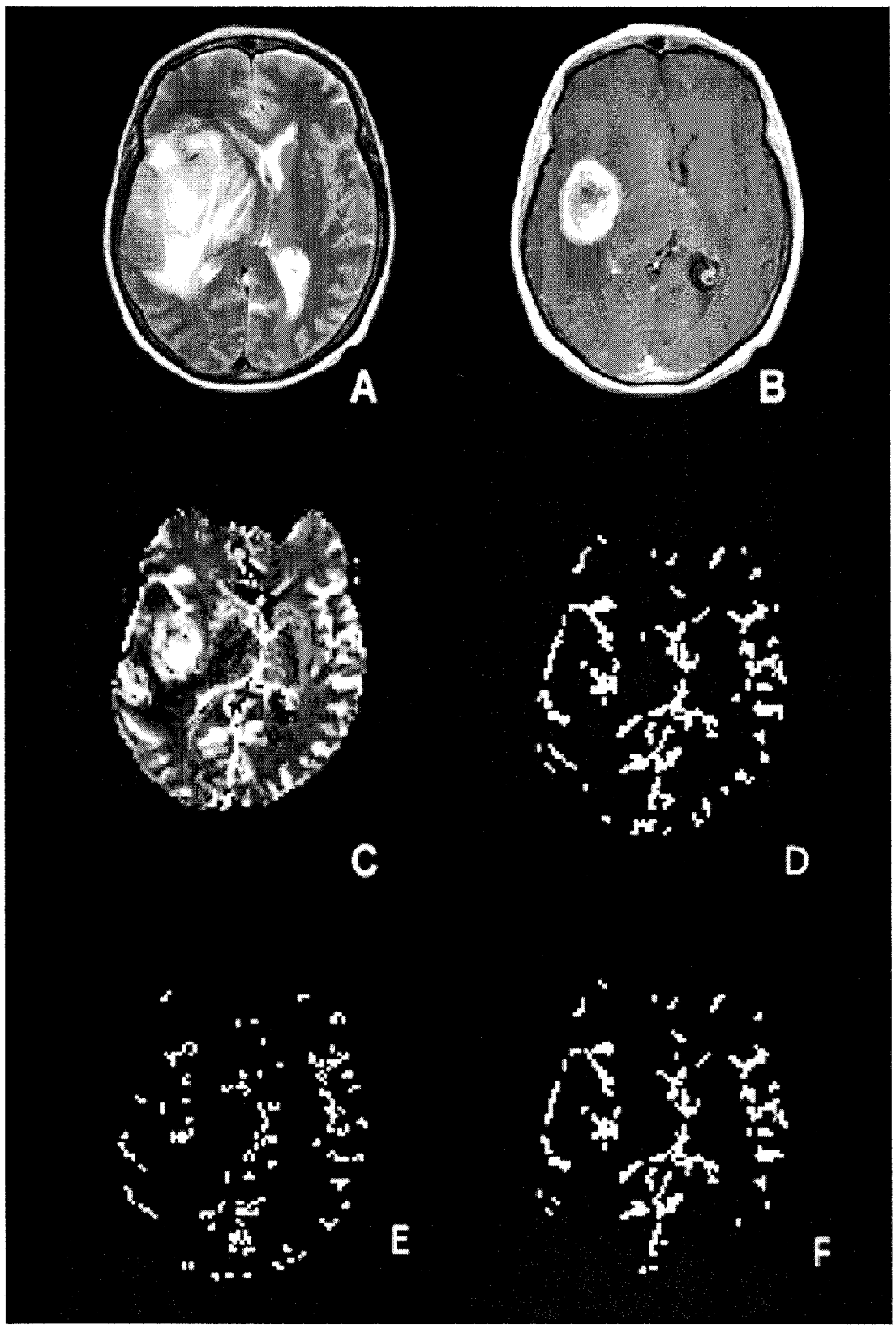
FIG. 10 shows: (A) Axial $T_2$-weighted fast spin-echo image (TR=4000/TE=104) of a patient with a high-grade (WHO grade IV) glioblastoma. (B) Axial post-contrast $T_1$-weighted spin-echo image (TR=500/TE=7.7) of the same patient. (C) Original rCBV map coregistered to (A). (D) Binary vessel mask coregistered to (A). (E) Binary MTT corrected vessel mask coregistered to (A). (F) Binary SI corrected vessel mask coregistered to (A). Note the more conservative vessel masking when using the MTT correction shown in (E) compared to vessel mask (D) and the SI corrected vessel mask (F).

FIGS. 10A-F and FIGS. 11A-D show equivalent images of a patient with a high-grade (WHO grade IV) glioblastoma. Here, FIGS. 10A and B show $T_2$-weighted and $T_1$-weighted images, respectively. FIG. 10C shows original rCBV map coregistered to 10A, and FIG. 10D shows binary vessel mask coregistered to 10A. FIGS. 10E and F show the binary MTT corrected and binary SI corrected vessel masks, respectively, both coregistered to 10A. Note the more conservative vessel masking when using the MTT correction shown in 10E compared to vessel mask 10D and the SI corrected vessel mask 10F.

Figure 11:
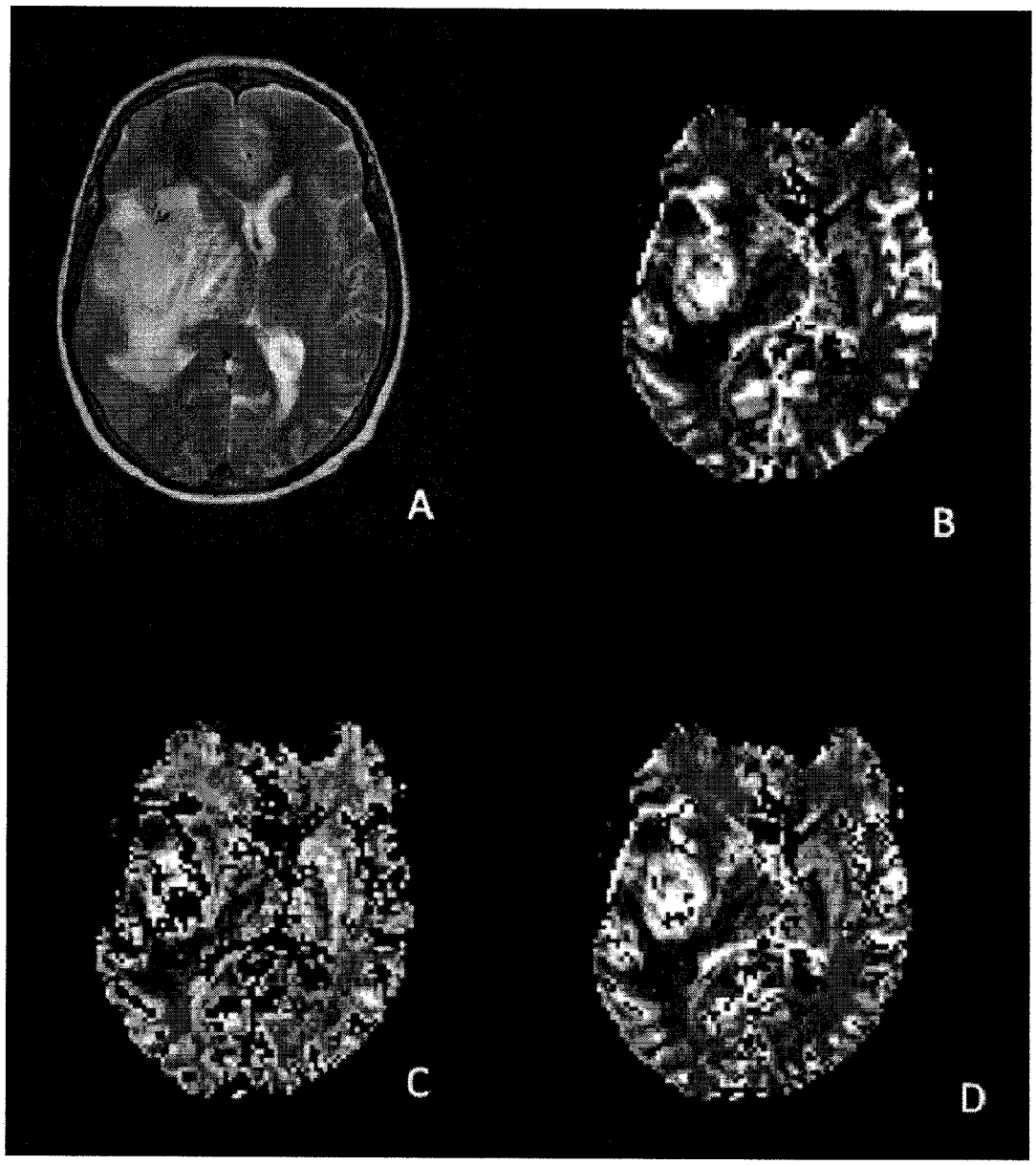
FIG. 11 shows: (B) Uncorrected rCBV map (C) vessel masked rCBV map and (D) vessel masked rCBV map with MTT correction. Compared to white matter rCBV values, note the higher rCBV values still present in the tumor area in (C-D). All rCBV maps were coregistered to the $T_2$-weighted images shown in (A).

FIG. 11B shows uncorrected rCBV map, FIG. 11C shows a vessel masked rCBV map, and FIG. 11D shows vessel masked rCBV map with MTT correction. Compared to white matter rCBV values, note the higher rCBV values still present in the tumor area in FIGS. 11C and D. All rCBV maps were coregistered to the $T_2$-weighted images shown in 11A.

Glioma Grading

Figure 12:
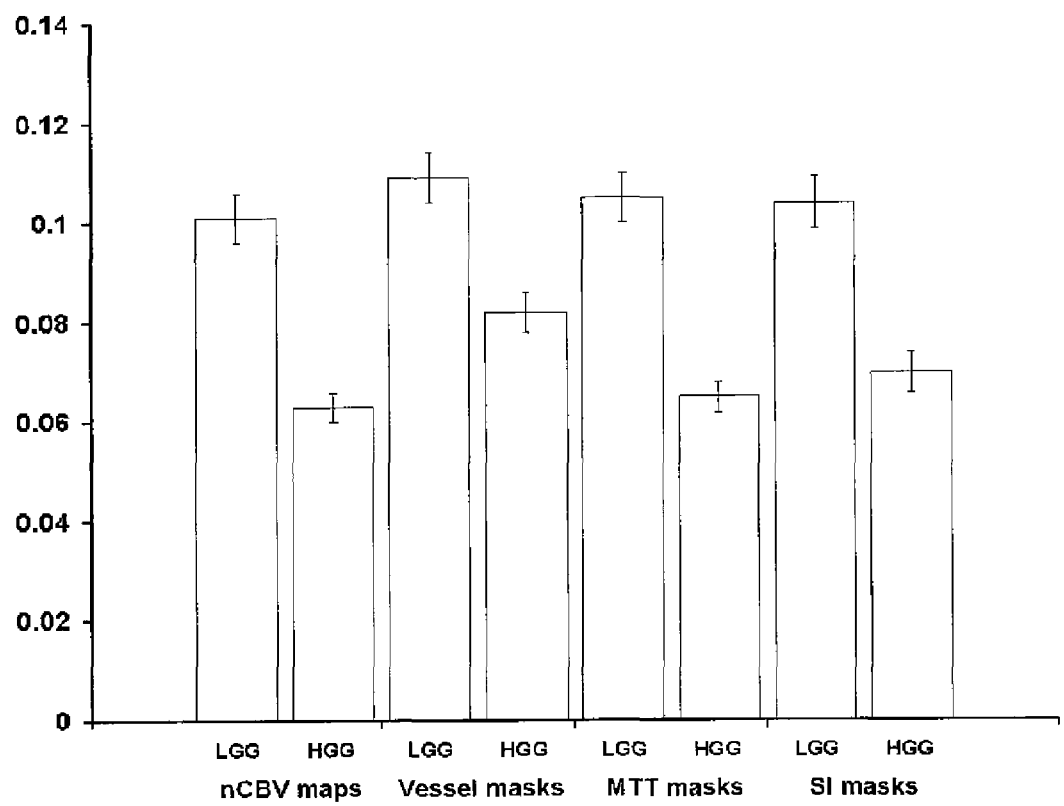
FIG. 12 illustrates mean histogram peak heights with standard error bars for low-grade gliomas (LGG) and high-grade gliomas (HGG) when using the original nCBV maps, vessel masks, MTT corrected vessel masks and SI corrected vessel masks, respectively.

Mean histogram peak heights with standard errors for LGG and HGG when using the original nCBV maps and the vessel segmented nCBV maps are shown in FIG. 12. The sensitivity values, specificity values, NPV and PPV of the glioma grading using the original nCBV maps and the different vessel segmented nCBV maps are shown in Table 1 below.

TABLE 1

Diagnostic accuracy values for the glioma grading using the original nCBV maps and the three segmented nCBV maps.

| | Sensitivity (%) | Specificity (%) | NPV (%) | PPV (%) |
|---|---|---|---|---|
| Original nCBV maps | 80 | 72 | 74 | 78 |
| Vessel mask | 80 | 67 | 73 | 75 |
| MTT corrected vessel masks | 82 | 78 | 78 | 82 |
| SI corrected vessel masks | 80 | 69 | 74 | 77 |

NPV = Negative Predictive Value,
PPV = Positive Predicitve Value

Figure 13:
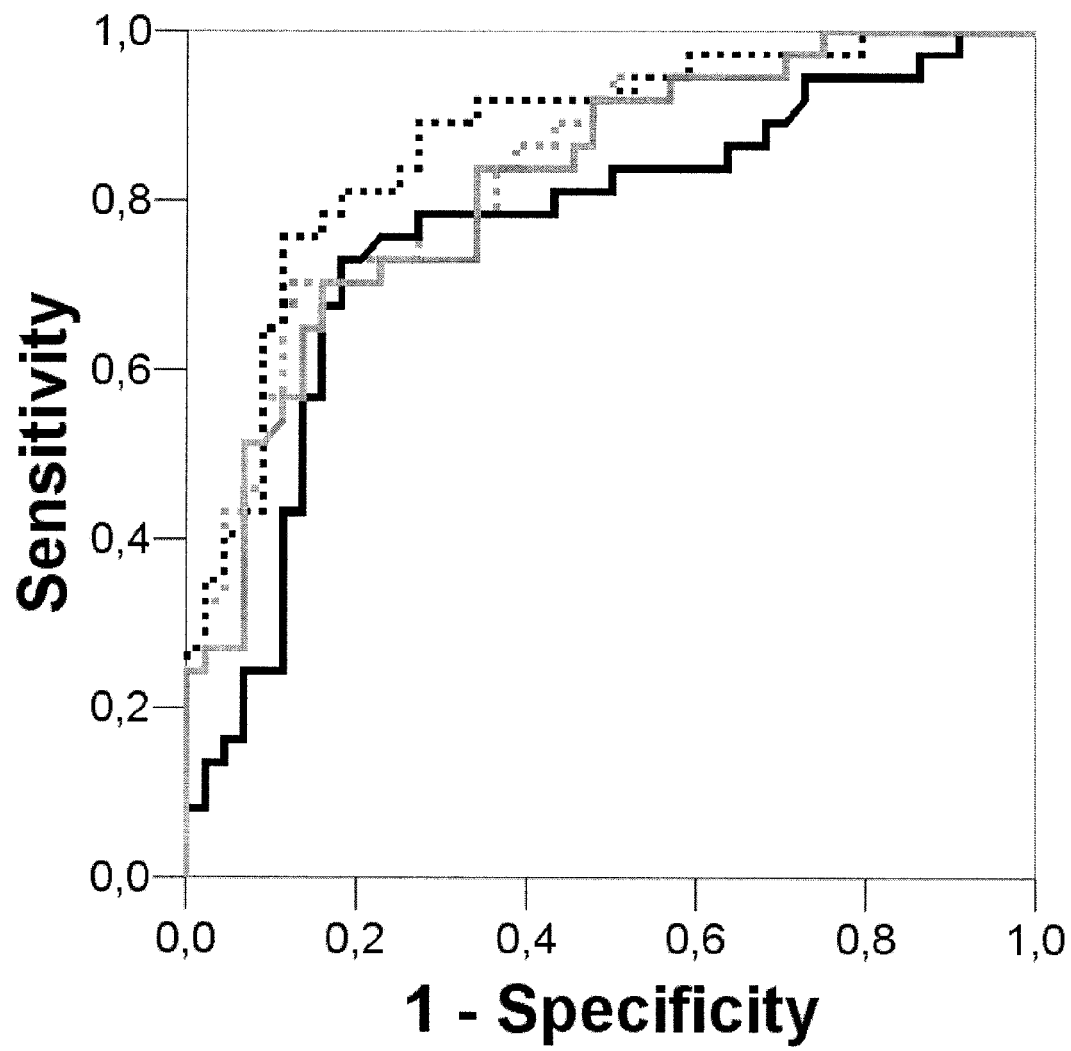
FIG. 13 illustrates a receiver operator characteristics (ROC) curve for the histogram method when using the original nCBV maps (dotted gray line), vessel masks (solid black line), MTT corrected vessel masks (dotted black line) and SI corrected vessel masks (solid gray line). The areas (±standard errors) under the ROC curve were as follows; original nCBV maps=0.828 (±0.048), vessel masks=0.751 (±0.056), MTT corrected vessel masks=0.856 (±0.044) and SI corrected vessel masks=0.808 (±0.050). The ROC curve when using MTT corrected vessel masks was significantly higher than the other curves (P<0.022).

For all measures of diagnostic accuracy, the highest values when grading gliomas was obtained when using the MTT corrected vessel masks. The resulting ROC curves with $A_z$ values (±standard error) are shown in FIG. 13. Here, the $A_z$ value when using MTT corrected vessel masks in the glioma grading was significantly higher than glioma grading based on the original nCBV maps (P=0.021), vessel masks (P=0.002) and SI corrected vessel masks (P=0.007). Also, the $A_z$ value when using the vessel masks was significantly lower than the original nCBV maps (P=0.018) and the SI corrected vessel masks (P=0.038).

The Kaplan-Meier survival curves are shown in FIG. 14. The Log-Rank (Mantel Cox) values describing the difference between the survival curves for HGGs and LGGs were as follows; histology=29.244, original nCBV maps=10.969, vessel masks=6.940, MTT corrected vessel masks=22.007 and SI corrected vessel masks=12.636.

Figure 15:
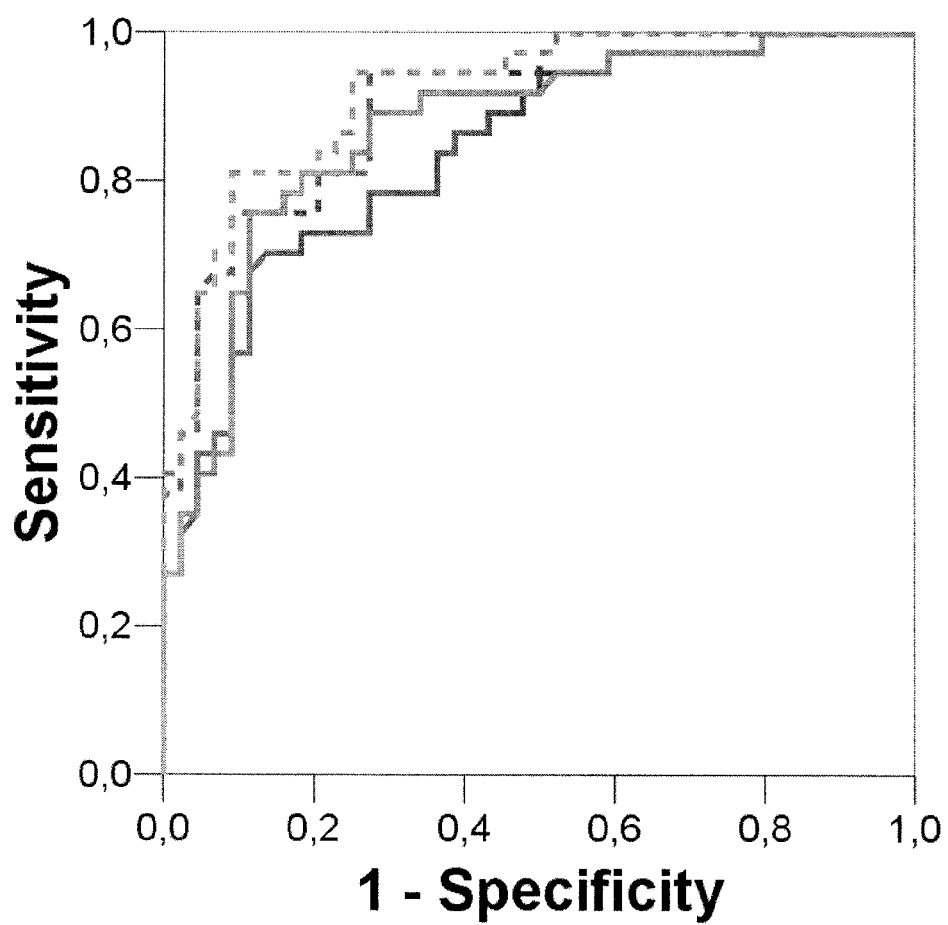
FIG. 15 shows manual tumor definition versus automatic tumor segmentation in combination with possible application of the vessel masks in accordance with various embodiments of the invention. Receiver operator characteristics (ROC) curve for the histogram method when grading gliomas using manual defined tumor volumes (dotted lines) and the automatic tumor segmentation procedure (solid lines). The glioma grading was performed using the original nCBV maps (blue lines) and the MTT corrected vessel masks (green lines).

FIG. 15 shows manual tumor definition versus automatic tumor segmentation in combination with possible application of the vessel masks. Here, receiver operator characteristics (ROC) curves for the histogram method are shown when grading gliomas using manual defined tumor volumes (dotted lines) and the automatic tumor segmentation procedure (solid lines). The glioma grading was performed using the original nCBV maps (dark grey lines) and the MTT corrected vessel masks (light grey lines).

The $A_z$ values (±standard errors) were as follows;
Manual; original nCBV maps=0.894 (±0.034)
Manual; MTT corrected vessel masks=0.906 (±0.032)
Automatic; original nCBV maps=0.828 (±0.045)
Automatic; MTT corrected vessel masks=0.856 (±0.042)
Pair-wise comparisons of areas under the ROC curves:
Manual; original nCBV maps vs. Manual; MTT corr. vessel masks P=0.190
Manual; original nCBV maps vs. Automatic; original nCBV maps P=0.080
Manual; original nCBV maps vs. Automatic; MTT corr. vessel masks P=0.307
Manual; MTT corr. vessel masks vs. Automatic; original nCBV maps P=0.046 (significant)
Manual; MTT corr. vessel masks vs. Automatic; MTT corr. vessel masks P=0.180
Automatic; original nCBV maps vs. Automatic; MTT corr. vessel masks P=0.021 (significant)

Using either a hot-spot or a histogram analysis method, glioma malignancy is typically assessed from relative (r)CBV values in the tumor area following normalization of quantitative CBV values to a reference, normal-appearing mean CBV value. Typically, normal-appearing white matter areas are used as the basis for the reference CBV value, although alternative methods exist using white matter for tumors with origin in the white matter and gray matter for tumors with origin in the gray matter. The need for manual definition of the reference tissue is time consuming. Further, the reference region-of-interest (ROI) is defined by a few pixels only, with resulting user-dependence and lack of robustness. Alternatively, it has been suggested to use a histogram approach to automatically identify a set of voxels in the first pre-contrast DSC image with intensity values corresponding to normal brain tissue. Although promising, the use of a single baseline image renders the method MR system dependant and prone to saturation effects. In addition, no knowledge of the dynamic time curve is included in the analysis.

An embodiment of the invention provides an alternative automatic method utilizing the DSC first-pass response to derive a slice-specific, mean reference CBV value from all pixels determined to represent normal-appearing brain tissue. Using the characteristics of the first-pass response, confounding pixels thought to represent vessels, noise, tumor or non-brain pixels are automatically excluded from the reference CBV value, and the resulting mean CBV value is therefore expected to represent normal-appearing grey and white matter values.

The proposed method was evaluated in 101 patients (aged 6-76 yrs, mean age 46; 57 males, 44 females) with a histopathological diagnosis of a glioma after MR imaging and subsequent surgery. Fifteen patients had recurrent tumors. No patients received radiation treatment prior to MR imaging.

MR imaging was performed at 1.5 Tesla, but other field strengths may also be used. The protocol included a 19 slice axial T2-weighted fast spin-echo sequence with 4000/104 (repetition time msec/echo time msec) and a pre-/post-contrast 19 slice axial T1-weighted spin-echo sequence (500/7.7). DSC imaging was performed using a whole-brain (12-14 slices) single-shot gradient-echo echo-planar imaging sequence (1430/46) acquired during contrast agent administration. The voxel size was 1.80×1.80×5 mm³, inter-slice gap of 1.5 mm, flip angle 90 degrees. For each slice, 50 images were recorded at each repetition time. After approximately 8 time-points, 0.2 mmol/kg of Gadobutrol (Gadovist, Bayer Schering Pharma AG, Berlin, Germany) was injected intravenously.

Normalization Procedure

First, in a pre-contrast DSC image, e.g. the first image, identify and exclude noisy pixels with a mean baseline value below a predefined noise threshold, using e.g. Otsu's method (see Otsu N A. A Threshold Selection Method from Gray-Level Histograms. IEEE Transactions on Systems, Man, and Cybernetics 1979:9:62-6). Also, identify and exclude tumor pixels, e.g. by performing a 5-class k-means clustering on the first pre-contrast DSC image and removing the cluster class with the highest mean signal intensity (SI) value.

Next, identify, in all DSC slices and for all remaining pixels, first-pass curves thought to represent normal-appearing brain tissue pixels. This should preferably performed by excluding all confounding vessel-like and otherwise abnormal first-pass curves using e.g. one or more of the following criteria:

Identify and exclude vessel pixels using a previously described DSC-based vessel segmentation technique.

Identify and exclude spur pixel values from first-pass curves with a peak value in the global baseline area (i.e. prior to primary injection).

Identify and exclude from first-pass curves erroneous pixels with evident T1-leakage effects (post-bolus signal below baseline) or T2-leakage effects (post-bolus signal above baseline, e.g. by more than two standard deviations) compared to a mean global first-pass curve.

Figure 16:
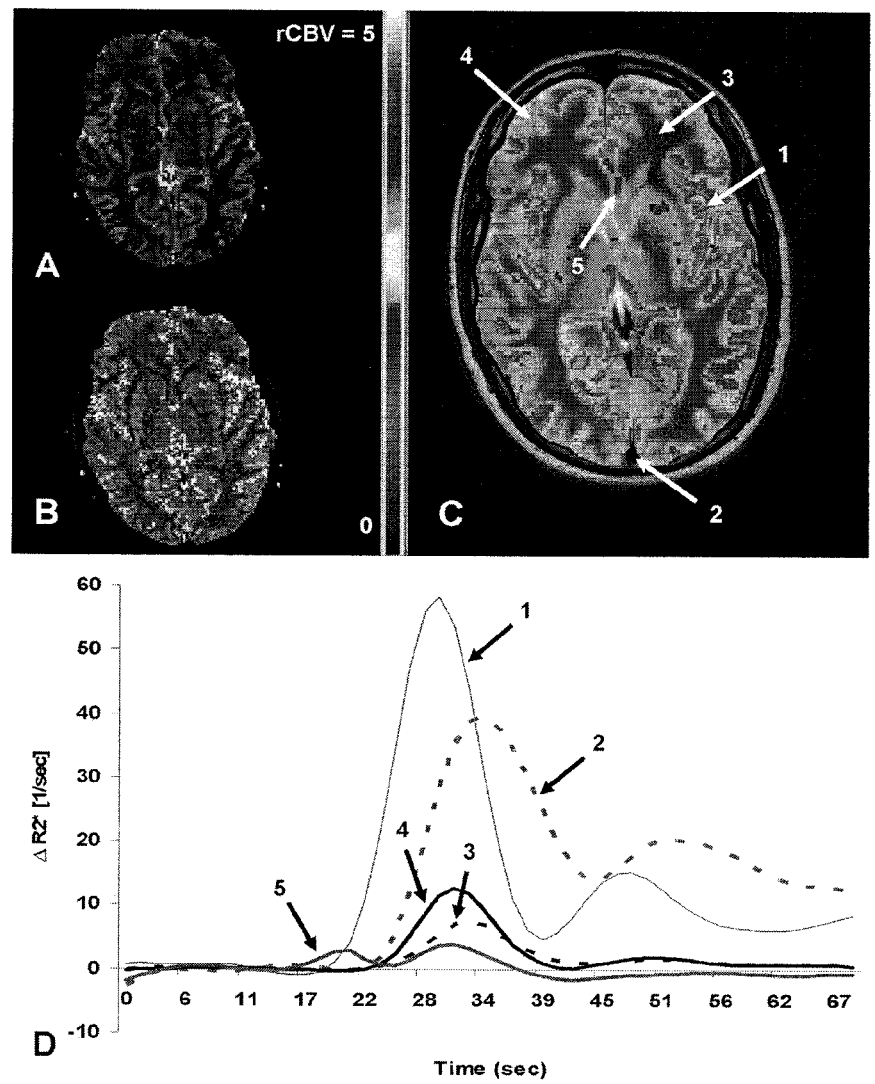
FIG. 16 shows axial, normalized rCBV maps using the automated method (A) and the manual reference method (B). In (A), the reference CBV value is a mean value of CBV values from normal-appearing white matter and gray matter tissue, shown as overlay (red/yellow) on an axial T2-weighted MR image (C). In (B), only white matter CBV values were used to derive the reference CBV value (shown as white scatter points in the right frontal lobe), resulting in higher normalized rCBV values compared to (A). The first-pass curves from arteries (1), veins (2), white matter (3), gray matter (4) and a noisy pixel (5) are shown in (D). To derive the automatic reference CBV value, first-pass curves with similar characteristics to the red curves (1, 2, 5) were automatically excluded from the normal-appearing CBV values in (C). 34×43 mm (600×600 DPI).

Examples of included and excluded first-pass curves are shown in FIG. 16.

Finally, assess, from the remaining pixels thought to represent normal-appearing brain tissue, a mean reference CBV value for each DSC-slice.

The above normalization procedure is particularly useful for normalizing CBV maps in DSC-based glioma images.

DSC Analysis

The CBV maps can be generated using established methods and corrected for possible extravascular contrast agent leakage effects. Two sets of rCBV maps are created by normalizing all CBV pixels to (1) the automatically defined reference CBV value and (2) a conventional manually defined CBV reference value in normal-appearing white matter (FIG. 16). As described by others, based on anatomical MR underlay images and CBV overlay maps prior to any rCBV normalization, tumor ROIs were drawn manually in each slice by an experienced neuroradiologist taking care to avoid areas of necrosis, edema or nontumor macrovessels evident on the post-contrast T1-weighted images. All image processing was performed using nordicICE (NordicImagingLab, Bergen, Norway) and Matlab R2008a (Math Works, Natick, US).

Statistical Comparisons

The time used to perform the conventional and automatic normalization procedure was recorded. Furthermore, a histogram analysis method was used to derive pair-wise correlation measures (Pearson) between histogram peak heights and logistic regression was used in combination with available survival data to derive Cox's Hazard Ratios and Kaplan-Meier survival curves with respect to separating a 'high-risk group' (survival<2 years after MR examination) from a 'low-risk group' (>2 years) regardless of histopathological grade. In the regression analysis, patient age was included as a second covariate. Statistical analysis was performed using SPSS 15 (SPSS, Inc., Chicago, Ill., USA).

Results

Of the 101 patients investigated, there were 6 WHO grade I pilocytic astrocytomas, 20 grade II diffuse astrocytomas, 9 grade II oligodendrogliomas and 15 grade II oligoastrocytomas, 1 grade II ganglioglioma, 3 grade III anaplastic astrocytomas, 3 grade III anaplastic oligodendrogliomas, 6 grade III anaplastic oligoastrocytomas and 38 grade IV glioblastomas.

Figure 17:
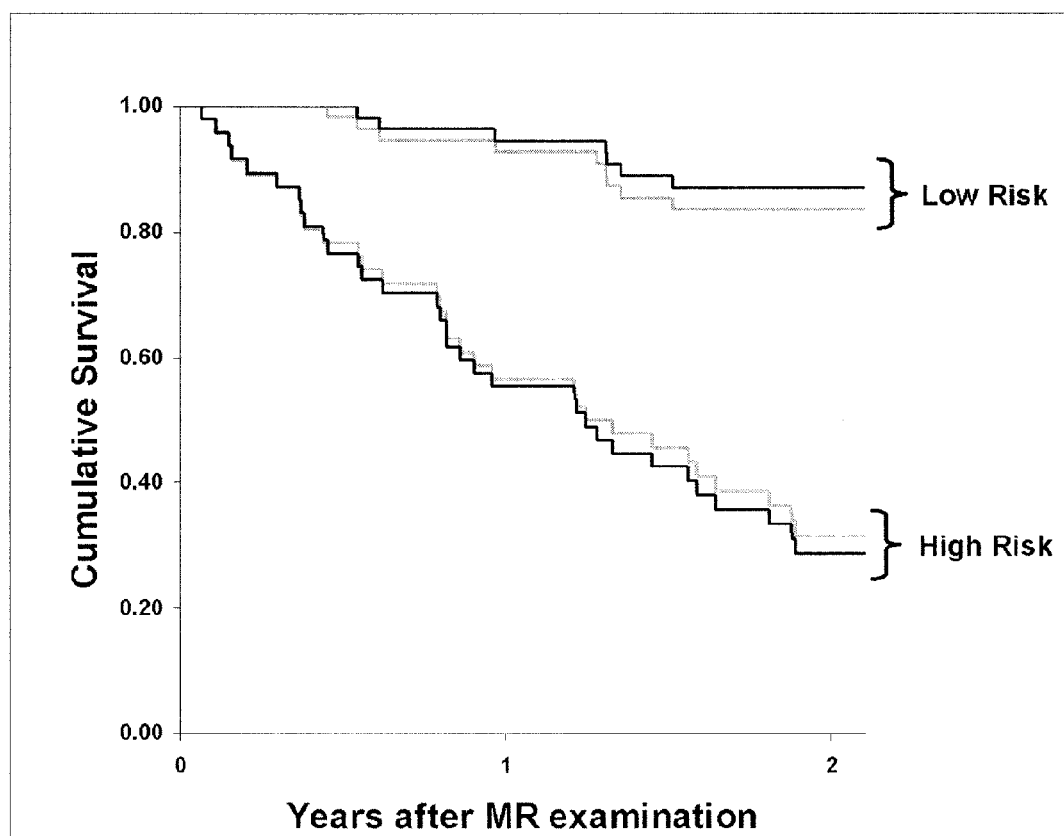
FIG. 17: Based on histogram peak heights with patient age as a covariate, the figure shows results of Kaplan-Meier survival analysis for the automatic normalization procedure (black lines) and the manual reference method (gray lines) when separating a 'high-risk' group with expected survival of less than 2 years from a 'low-risk' group with expected survival of more than 2 years. The log-rank value between the high- and low-risk groups was higher for the automatic method (Mantel-Cox Chi-Square=38.287; P<0.001) compared to the manual reference method (30.029; P<0.001). 21×17 mm (600×600 DPI).

Based on the manually defined white matter definitions, the mean (±st.dev) rCBV values in normal-appearing white matter were 0.96 (±0.11) for the manual method and 0.64 (±0.09) for the automatic method (FIG. 16). The manual procedure took approximately 1-2 minutes to perform whereas the automatic procedure was performed within seconds. The pairwise correlation between the histogram peak heights when using the manual reference method and the automatic normalization procedure was significant at the 0.01 level (r=0.792). The log-rank (Mantel-Cox Chi-Square) values describing the difference between the survival curves for the low- and high-risk groups were higher for the automatic method than the manual reference method (38.287; P<0.001 and 30.029; P<0.001, respectively) as shown in FIG. 17. The corresponding Cox' Hazard Ratios (with 95% confidence intervals) were 8.707 (3.834-19.774) and 6.229 (2.955-13.131) for the automatic and manual method, respectively.

Discussion

Current methods for manual selection of reference CBV values in DSC-based glioma grading is time consuming and subjective. In any DSC-based grading method not using quantitative CBV maps after determination of an arterial input function, the normalization procedure is a critical step providing relative CBV values comparable between patients. Also, the normalization procedure corrects for signal-to-noise variations across the image volume. An embodiment of the invention proposes a fast, automatic method including every image pixel in the CBV maps with a first-pass curve suggestive of normal-appearing brain tissue. Pixel values thought to represent arteries and veins were excluded. In addition, as the applied vessel segmentation routine only identifies pixels with indisputable vessel-like first-pass curves, the normalization procedure was further improved by excluding presumed tumor pixels and pixels with noisy first-pass curves. Although the proposed normalization procedure was compared to the manual reference normalization from one neuroradiologist only and thus should also be compared to the inter- and intra-observer variations of the manual reference method, the results suggest that the automatic normalization procedure correlates well with the manual reference method.

Results of the Cox's proportional hazards model and Kaplan-Meier survival analysis suggest that the automatic method according to an embodiment of the invention provides better discrimination between a high-risk and a low-risk patient group. Instead of assessing diagnostic accuracy values with respect to glioma grade, survival analysis was used since histopathological glioma grade from tissue sampling is inherently limited by small and inaccurate tissue samples, inaccessibility and subjective grading criteria. Potentially, in addition to survival analysis, the proposed normalization procedure is amendable to related applications such as differentiation of radiation treatments effects from recurrent tumor.

The proposed normalization procedure excluded image areas identified as tumor by the automatic k-means cluster pre-mask on the first pre-bolus DSC image. Although this image is prone to image artifacts as described in our study, this source of error should be limited as the first pre-bolus DSC image was used to exclude areas of T2 abnormality, secondary to pathology or fluids, only. Furthermore, our method assumes presence of tumor tissue in at least one or more DSC image slices. Thus, if performing the normalization procedure on non-tumor DSC images, the k-means clustering pre-masking routine can be removed. Also, as the tumor may be located in both the right and left hemisphere, the mean reference CBV values were based on normal-appearing voxels from the entire brain instead of just the contralateral side.

The inclusion of both gray and white matter CBV values resulted in a lower mean reference CBV values for the automatic method compared to the manual reference method, using white matter only. Thus, as gliomas involve predominately white matter, the automatic procedure may underestimate tumoral CBV values in predominantly white matter lesions. However, with the use of an intermediate gray and white mean CBV value and the large quanta of tumoral CBV values included in the histogram analysis, this source of error should be minimal. Equivalently, the manual reference method, using white matter values only, always overestimates gray matter lesions.

In conclusion, the invention provides a rapid, user-independent method for normalizing rCBV maps in DSC-based glioma imaging. The proposed method provide similar or better diagnostic accuracy values than the current manual approach and may easily be implemented in the clinical routine directly on the MR scanner or in third-party clinical applications in the hospital-wide picture archiving and communication system (PACS).

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for segmenting blood vessels in a perfusion related map from perfusion MR images comprising:
   clustering pixels from the perfusion related map into at least an arterial pixel class and a venous pixel class by performing a multi-class cluster analysis performed by an electronic processor applying one or more perfusion curve parameters representing the degree to which the tissue entirely consists of blood and one or more curve parameters representing different measures of contrast arrival at the tissue obtainable from perfusion curves for pixels in the perfusion MR images, wherein
arterial pixels belong to cluster(s):
   whose pixels have the earliest contrast arrival; and
   whose pixels consist of blood to the highest degree;
venous pixels belong to cluster(s):
   whose pixels have the latest contrast arrival; and
   whose pixels consist of blood to the highest degree;
   generating a vessel mask based on arterial pixels and venous pixels;
   performing a tumor segmentation using the perfusion MR images to determine pixels belonging to an assessed tumor region; and
   removing pixels from the determined vessel mask from the assessed tumor region.

2. The method according to claim 1, wherein said multi-class cluster analysis is performed in two clustering steps:
   a first clustering step applying the curve parameters representing the degree to which the tissue entirely consists of blood, wherein pixels in cluster(s) that consist of blood to the highest degree are selected as potential vessel pixels; and
   a second clustering step using only potential vessel pixels that have been selected in the first step, the second clustering step applying the curve parameters representing different measures of contrast arrival at the tissue and determining arterial and venous pixels.

3. The method according to claim 1, further comprising performing an initial multi-class cluster analysis applying curve parameters for relative mean transit time (rMTT) obtainable from the perfusion curves in the perfusion MR images, wherein pixels in cluster(s) with largest mean rMTT value(s) are not used in the subsequent cluster analysis into arterial and venous pixel classes.

4. The method according to claim 1, further comprising performing an initial multi-class cluster analysis applying curve parameters for intensity (SI) obtainable from the perfusion curves in the perfusion MR images, wherein pixels in cluster(s) with largest mean SI value(s) are not used in the subsequent cluster analysis into arterial and venous pixel classes.

5. The method according to claim 1, further comprising applying the resulting assessed tumor region, less pixels from the determined vessel mask, in an automated tumor grading.

6. The method according to claim 1, further comprising
   identifying and excluding noisy pixels with a mean baseline value below a predefined noise threshold in a pre-contrast DSC image;
   identifying and excluding tumor pixels;
   identifying, in all DSC slices and for all remaining pixels, first-pass curves thought to represent normal-appearing brain tissue pixels by excluding all confounding vessel-like and otherwise abnormal first-pass curves using one or more of the following criteria:
   identifying and excluding vessel pixels using a previously described DSC-based vessel segmentation technique; or
   identifying and excluding spur pixel values from first-pass curves with a peak value in the global baseline area; or
   identifying and excluding from first-pass curves erroneous pixels with evident T1-leakage effects or T2-leakage effects compared to a mean global first-pass curve.

7. A computer system adapted for performing each of the steps of the method according to claim 1.

8. The computer system according to claim 7, being adapted to perform computer aided tumor grading in that the computer system is further adapted to perform:
   an automated tumor segmentation to determine pixels belonging to an assessed tumor region; or
   an automated tumor grading, based on the pixels belonging to the assessed tumor region, less pixels from the determined vessel mask.

9. A computer program product stored on a non-transitory computer readable medium for automated vessel segmentation in a perfusion related map derived from perfusion MR images comprising:
   retrieving, for each pixel on the perfusion MR images, one or more curve parameters representing the degree to which the tissue in the pixel entirely consists of blood from perfusion curves;

retrieving, for each pixel on the perfusion MR images, one or more curve parameters representing different measures of contrast arrival at the tissue in the pixel from perfusion curves;

performing a k-class cluster analysis based on the retrieved curve parameters, where n≧3, comprising clustering the pixels into n cluster classes, the cluster analysis comprising determining:

(i) cluster(s) whose pixels consist of blood to the highest degree;

(ii) cluster(s) whose pixels have the earliest contrast arrival; and (iii) cluster(s) whose pixels have the latest contrast arrival; and generating a vessel mask based on pixels that are in both of clusters (i) and (ii) and pixels that are in both of clusters (i) and (iii).

10. A method for automated normalization of cerebral blood volume, CBV, maps based on dynamic susceptibility contrast, DSC, images, comprising:

identifying and excluding noisy pixels with a mean baseline value below a predefined noise threshold in a pre-contrast DSC image;

identifying and excluding tumor pixels;

identifying, in all DSC slices and for all remaining pixels, first-pass curves thought to represent normal-appearing brain tissue pixels by excluding all confounding vessel-like and otherwise abnormal first-pass curves using one or more of the following criteria:

identifying and excluding vessel pixels using a previously described DSC-based vessel segmentation technique; or identifying and excluding spur pixel values from first-pass curves with a peak value in the global baseline area; or identifying and excluding from first-pass curves erroneous pixels with evident T1-leakage effects or T2-leakage effects compared to a mean global first-pass curve.

* * * * *